(12) United States Patent
Fukuda et al.

(10) Patent No.: US 8,468,016 B2
(45) Date of Patent: Jun. 18, 2013

(54) SPEECH FEATURE EXTRACTION APPARATUS, SPEECH FEATURE EXTRACTION METHOD, AND SPEECH FEATURE EXTRACTION PROGRAM

(75) Inventors: Takashi Fukuda, Kanagawa-Ken (JP); Osamu Ichikawa, Kanagawa-ken (JP); Masafumi Nishimura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/604,721

(22) Filed: Sep. 6, 2012

(65) Prior Publication Data

US 2012/0330657 A1   Dec. 27, 2012

Related U.S. Application Data

(63) Continuation of application No. 13/392,901, filed as application No. PCT/JP2010/061800 on Jul. 12, 2010.

(30) Foreign Application Priority Data

Aug. 28, 2009   (JP) ................................. 2009-197853

(51) Int. Cl.
*G10L 19/02*   (2006.01)

(52) U.S. Cl.
USPC ........................................... 704/219; 704/226

(58) Field of Classification Search
USPC ................................................. 704/205–230
See application file for complete search history.

(56) References Cited

U.S. PATENT DOCUMENTS

| | | | |
|---|---|---|---|
| 2003/0055634 | A1 | 3/2003 | Hidaka et al. |
| 2006/0053003 | A1 | 3/2006 | Suzuki et al. |
| 2006/0184366 | A1 | 8/2006 | Hidaka et al. |
| 2007/0143108 | A1 | 6/2007 | Kurozumi et al. |
| 2009/0177423 | A1* | 7/2009 | Hong et al. ..................... 702/77 |

FOREIGN PATENT DOCUMENTS

| | | |
|---|---|---|
| JP | 2004-347956 | 12/2004 |
| JP | 2005-331588 | 12/2005 |
| JP | 2007-72481 | 3/2007 |

(Continued)

OTHER PUBLICATIONS

Gajic, Bojana et al.; Robust feature extraction using subband spectral centroid histograms; Acoustics, Speech, and Signal Processings 2001 IEEE International Conference on vol. 1, pp. 85-88; Pub. Year:2001.*
Fukuda, et al., "Short- and Long-term Dynamic Features for Robust Speech Recognition", Proc of 10th International Conference on Spoken Language Processing (ICSLP 2008 /Interspeech 2008), pp. 2262-2265, Sep. 2008, Brisbane, Australia.

(Continued)

*Primary Examiner* — Abul Azad
(74) *Attorney, Agent, or Firm* — Vazken Alexanian

(57) ABSTRACT

A speech feature extraction apparatus, speech feature extraction method, and speech feature extraction program. A speech feature extraction apparatus includes: first difference calculation module to: (i) receive, as an input, a spectrum of a speech signal segmented into frames for each frequency bin; and (ii) calculate a delta spectrum for each of the frame, where the delta spectrum is a difference of the spectrum within continuous frames for the frequency bin; and first normalization module to normalize the delta spectrum of the frame for the frequency bin by dividing the delta spectrum by a function of an average spectrum; where the average spectrum is an average of spectra through all frames that are overall speech for the frequency bin; and where an output of the first normalization module is defined as a first delta feature.

5 Claims, 15 Drawing Sheets

FOREIGN PATENT DOCUMENTS

| | | |
|---|---|---|
| JP | 2007-279444 | 10/2007 |
| JP | 2007-292827 | 11/2007 |
| JP | 2008-015002 | 1/2008 |
| JP | 2008-145923 | 6/2008 |
| JP | 2009-58708 | 3/2009 |
| JP | 2009-063773 | 3/2009 |

OTHER PUBLICATIONS

Fukuda, et al. "Voice activity detection using long-term spectro-temporal information and harmonice structure-based features," Tokyo Research Laboratory, IBM Japan, Ltd. 2008.

* cited by examiner

FIG. 6
(a)
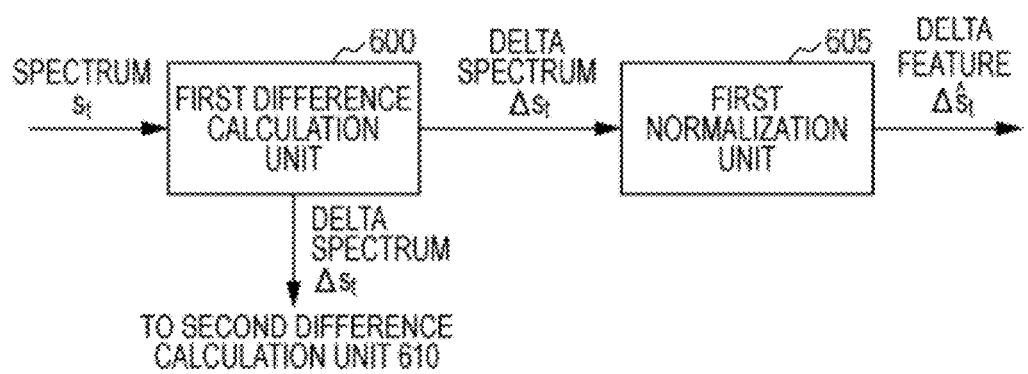
(b)
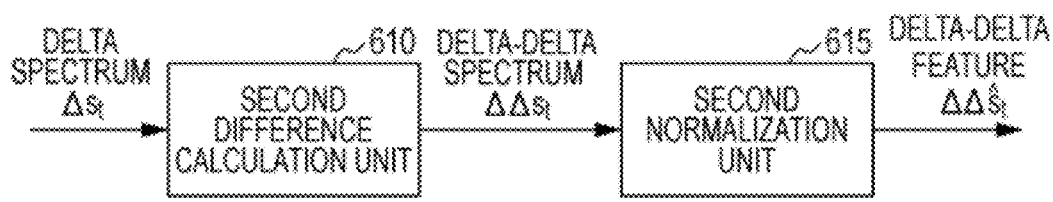

FIG. 9
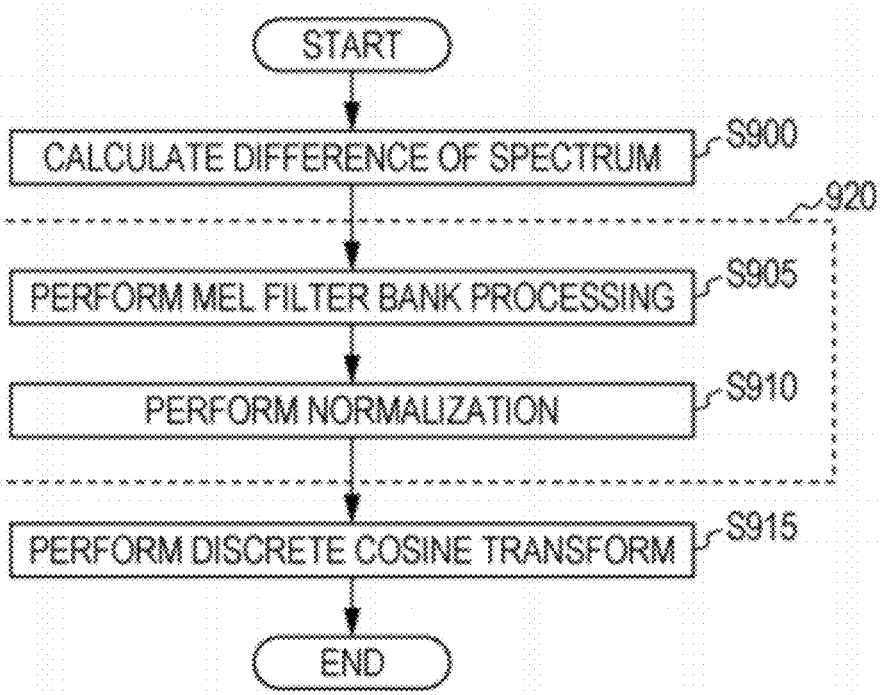
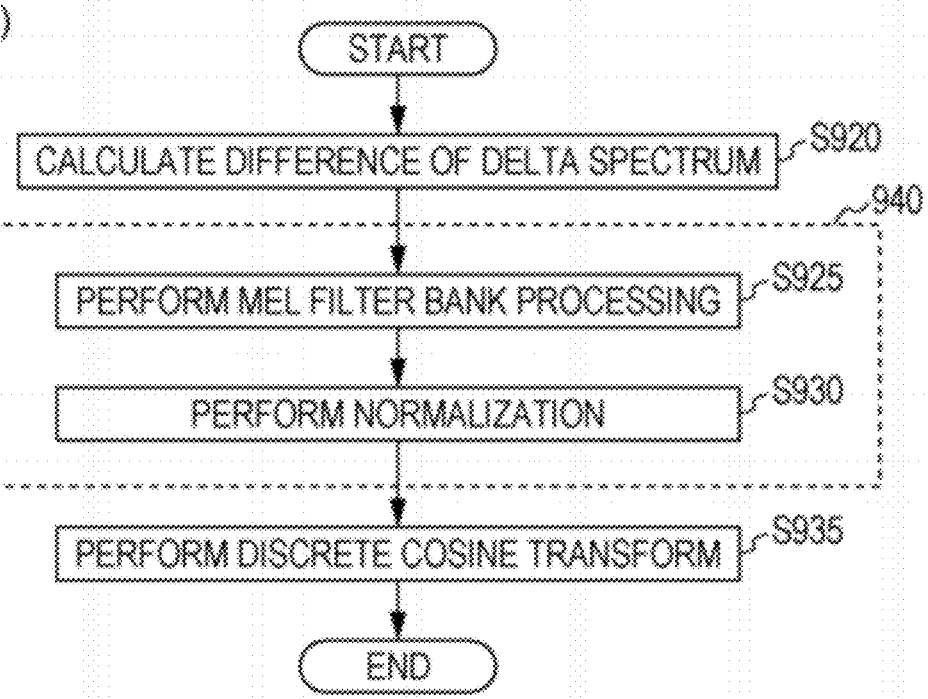

FIG. 13
(a)
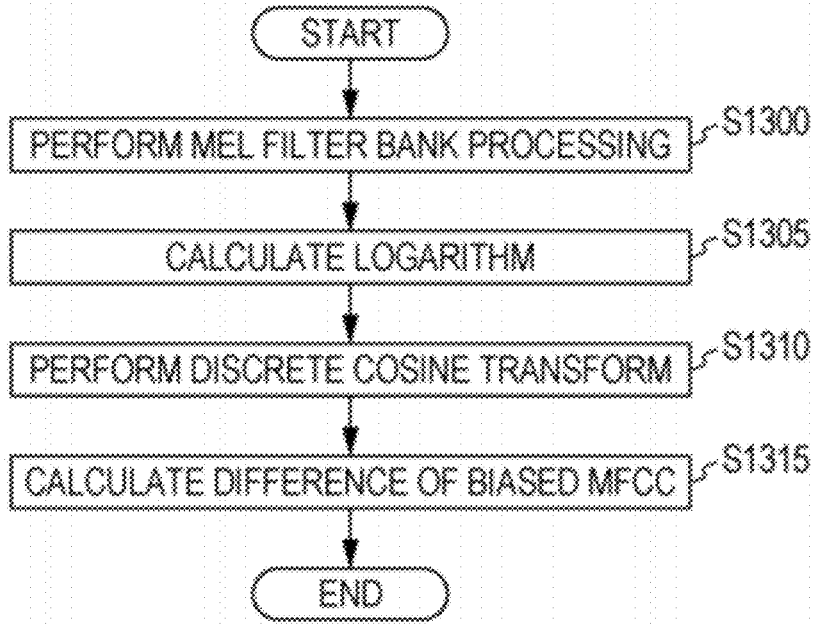
(b)
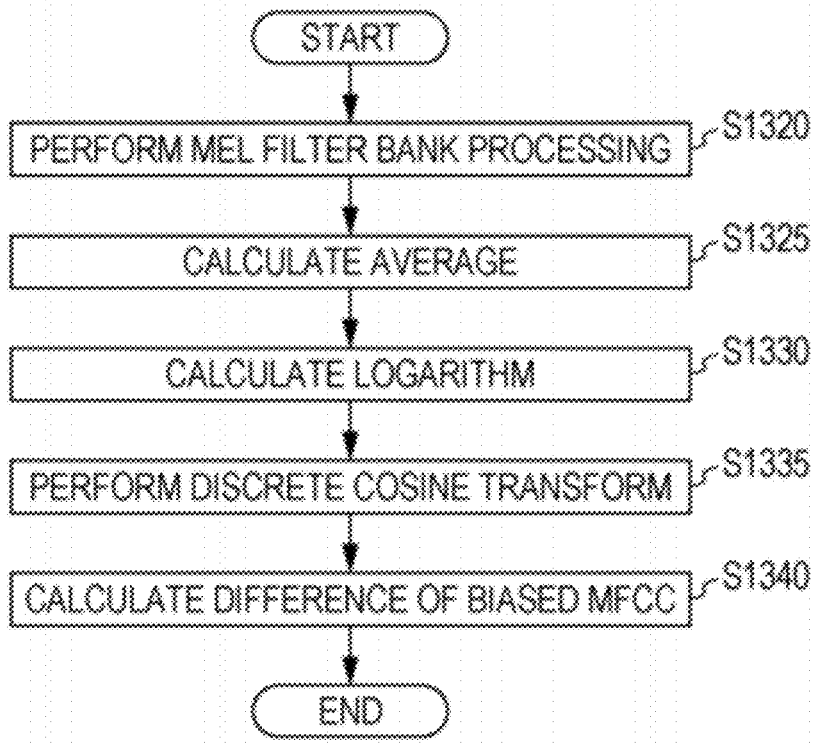

FIG. 16

| CHARACTER STRING RECOGNITION RATE (%) | | | mfcc 12 dim | mfcc 12 dim+Δ mfcc 12 dim | mfcc 12 dim+ linear Δ 12 dim |
|---|---|---|---|---|---|
| Clean Condition | A | OFFICE | 21.0 | 38.7 | 73.0 |
| | | ELEVATOR HALL | 23.1 | 29.7 | 36.1 |
| | | VEHICLE CABIN | 14.5 | 25.6 | 64.8 |
| | | LIVING ROOM | 21.3 | 48.5 | 65.0 |
| | | AVERAGE | 20.0 | 35.6 | 59.7 |
| | B | LOUNGE | 5.4 | 12.0 | 30.7 |
| | | JAPANESE ROOM | 28.5 | 52.5 | 80.1 |
| | | MEETING ROOM | 21.2 | 39.9 | 68.5 |
| | | BATH ROOM | 9.8 | 35.8 | 55.3 |
| | | AVERAGE | 16.2 | 35.0 | 58.7 |
| | (A+B) AVERAGE | | 18.1 | 35.3 | 59.2 |
| Multi-Condition | A | OFFICE | 61.2 | 81.5 | 85.8 |
| | | ELEVATOR HALL | 50.0 | 73.1 | 77.6 |
| | | VEHICLE CABIN | 68.6 | 87.5 | 87.4 |
| | | LIVING ROOM | 51.3 | 76.3 | 82.8 |
| | | AVERAGE | 57.8 | 79.6 | 83.4 |
| | B | LOUNGE | 6.5 | 35.2 | 74.8 |
| | | JAPANESE ROOM | 58.8 | 82.0 | 84.8 |
| | | MEETING ROOM | 55.2 | 79.4 | 85.4 |
| | | BATH ROOM | 34.6 | 59.8 | 73.2 |
| | | AVERAGE | 38.8 | 64.1 | 79.6 |
| | (A+B) AVERAGE | | 48.3 | 71.9 | 81.5 |

FIG. 17

| CHARACTER STRING RECOGNITION RATE (%) | | | BASELINE (*1) | linearΔ (*2) |
|---|---|---|---|---|
| Clean Condition | A | OFFICE | 93.1 | 90.9 |
| | | ELEVATOR HALL | 30.7 | 25.1 |
| | | VEHICLE CABIN | 86.1 | 91.8 |
| | | LIVING ROOM | 65.3 | 78.6 |
| | | AVERAGE | 68.8 | 71.6 |
| | B | LOUNGE | 43.9 | 61.9 |
| | | JAPANESE ROOM | 74.1 | 81.4 |
| | | MEETING ROOM | 74.1 | 84.3 |
| | | BATH ROOM | 54.3 | 70.9 |
| | | AVERAGE | 61.6 | 74.6 |
| | (A+B) AVERAGE | | 65.2 | 73.1 |
| Multi-Condition | A | OFFICE | 84.0 | 86.3 |
| | | ELEVATOR HALL | 76.5 | 76.6 |
| | | VEHICLE CABIN | 85.0 | 84.8 |
| | | LIVING ROOM | 77.4 | 83.7 |
| | | AVERAGE | 80.7 | 82.9 |
| | B | LOUNGE | 52.5 | 81.9 |
| | | JAPANESE ROOM | 82.3 | 83.8 |
| | | MEETING ROOM | 81.6 | 85.7 |
| | | BATH ROOM | 62.0 | 78.4 |
| | | AVERAGE | 69.6 | 82.5 |
| | (A+B) AVERAGE | | 75.2 | 82.7 |

*1 : mfcc 12 dim + Δmfcc 12 dim + ΔΔmfcc 12 dim + p + Δp + ΔΔp
*2 : mfcc 12 dim + linear Δ12 dim + linear ΔΔ12 dim + p + Δp + ΔΔp

FIG. 18

| CENSREC-3 (Condition 3) | | | WORD RECOGNITION RATE (%) | | | |
|---|---|---|---|---|---|---|
| | | | BASELINE (*1) | LPW_Mel (*2) | linearΔ (*3) | LPW_Mel +linearΔ (*4) |
| IDLING | AUDIO OFF | NORMAL | 99.7 | 99.8 | 99.1 | 99.7 |
| | | HAZARD LAMP ON | 98.7 | 99.2 | 96.0 | 98.2 |
| | | FAN MINIMUM | 94.6 | 96.4 | 97.0 | 98.3 |
| | | FAN MAXIMUM | 53.4 | 63.6 | 69.3 | 70.1 |
| | | WINDOW OPEN | 90.0 | 92.7 | 94.3 | 95.1 |
| | AUDIO ON | | 81.4 | 73.1 | 82.7 | 70.5 |
| LOW SPEED DRIVE | AUDIO OFF | NORMAL | 99.3 | 99.2 | 98.4 | 98.1 |
| | | FAN MINIMUM | 95.1 | 96.4 | 94.8 | 95.5 |
| | | FAN MAXIMUM | 62.7 | 73.0 | 74.2 | 76.8 |
| | | WINDOW OPEN | 66.2 | 71.8 | 73.0 | 78.6 |
| | AUDIO ON | | 79.0 | 72.1 | 81.0 | 73.7 |
| HIGH SPEED DRIVE | AUDIO OFF | NORMAL | 95.0 | 95.7 | 94.1 | 95.3 |
| | | FAN MINIMUM | 89.0 | 90.4 | 89.9 | 91.1 |
| | | FAN MAXIMUM | 58.2 | 67.8 | 70.0 | 74.9 |
| | | WINDOW OPEN | 22.2 | 24.6 | 36.4 | 46.6 |
| | AUDIO ON | | 79.3 | 69.1 | 82.7 | 70.6 |
| AVERAGE (TOTAL) | | | 78.9 | 80.3 | 83.3 | 83.3 |
| AVERAGE (AUDIO OFF) | | | 78.8 | 82.3 | 83.6 | 86.0 |
| AVERAGE (AUDIO ON) | | | 79.9 | 71.4 | 82.1 | 71.6 |
| AVERAGE (FAN MAXIMUM) | | | 58.1 | 68.1 | 71.2 | 73.9 |
| AVERAGE (WINDOW OPEN) | | | 59.5 | 63.0 | 67.9 | 73.4 |

*1 : mfcc 12 dim + Δmfcc 12 dim + ΔΔmfcc 12 dim + p + Δp + ΔΔp
*2 : lpw mfcc 12 dim + Δlpw mfcc 12 dim + ΔΔlpw mfcc 12 dim + p + Δp + ΔΔp
*3 : mfcc 12 dim + linear Δ12 dim + linear ΔΔ12 dim + p + Δp + ΔΔp
*4 : lpw mfcc 12 dim + lpw linear Δ12 dim + lpw linear ΔΔ12 dim + p + Δp + ΔΔp

US 8,468,016 B2

SPEECH FEATURE EXTRACTION APPARATUS, SPEECH FEATURE EXTRACTION METHOD, AND SPEECH FEATURE EXTRACTION PROGRAM

CROSS-REFERENCE TO RELATED APPLICATION

This application is a continuation of and claims priority from U.S. patent application Ser. No. 13/392,901, filed Feb. 28, 2012, which in turn is a U.S. National Stage application under 35 U.S.C. §371 based on International Application No. PCT/JP2010/061800 filed Jul. 12, 2010, which claims priority to Japanese Patent Application No. 2008-315655, filed Feb. 28, 2009. The entire contents of the preceding applications are incorporated herein by reference.

BACKGROUND OF THE INVENTION

1. Field of the Invention

The present invention relates to techniques for extracting features from speech signals. More particularly, the present invention relates to a technique for extracting delta and delta-delta features robust to reverberation, noise, and the like.

2. Description of Related Art

The noise robustness and reverberation robustness of speech recognition apparatuses have been continuously improved. However, the recognition accuracy under hard conditions has not been sufficiently improved yet. Regarding the noise robustness, it is known that the recognition rate is extremely low under, for example, conditions in which the S/N ratio is extremely low, such as driving a vehicle at a high speed, with the window being open, and unsteady noise conditions, such as music and bustle. Moreover, regarding the reverberation robustness, it is known that the recognition rate is extremely low in places in which much sound reflection and reverberation occur, such as a concrete corridor and an elevator hall, even with little noise.

Various solutions to these problems having been hitherto examined can be classified into the following four types: (1) a front end method for removing reverberation, noise, and the like by preprocessing observed signals (for example, refer to Japanese Unexamined Patent Application Publication No. 2009-58708 and Japanese Unexamined Patent Application Publication No. 2004-347956), (2) a multi-style training method in which an acoustic model is learned, using sounds including reverberation, noise, and the like (for example, refer to Japanese Unexamined Patent Application Publication No. 2007-72481), (3) an adaptation method for transforming features or an acoustic model so that observed sounds match the acoustic model (for example, refer to Japanese Unexamined Patent Application Publication No. 2007-279444), and (4) a feature extraction method in which features robust to reverberation, noise, and the like are used. An example is provided by Takashi Fukuda, Osamu Ichikawa, Masafumi Nishimura, "Short- and Long-term Dynamic Features for Robust Speech Recognition", Proc of 10th International Conference on Spoken Language Processing (ICSLP 2008/Interspeech 2008), pp. 2262-2265, September 2008, Brisbane, Australia.

Each of the aforementioned methods can be combined with another method. For example, a combination may be considered, in which the methods (2), (3), and (4) are combined, LDA is used as feature extraction, an acoustic model is created by multi-style training, and then adaptation is made by MLLR. Thus, it is important to improve not only one of the aforementioned methods but each of the methods (1) to (4).

SUMMARY OF THE INVENTION

However, regarding feature extraction in (4), features extremely robust to noise, reverberation, and the like have not been found yet. Especially, features excellent in reverberation robustness are seldom known. Thus, in many types of speech recognition, a combination of a Mel-Frequency Cepstrum Coefficient (MFCC) and the delta (first order variation) and delta delta (second order variation) of the MFCC or the results of linear transformation of these values are currently used.

The technique in Takashi Fukuda, Osamu Ichikawa, Masafumi Nishimura, "Short- and Long-term Dynamic Features for Robust Speech Recognition", Proc of 10th International Conference on Spoken Language Processing (ICSLP 2008/Interspeech 2008), pp. 2262-2265, September 2008, Brisbane, Australia. involving the applicant has enabled an improvement in the accuracy of speech recognition by using, as a feature, the delta of an MFCC in a wide window width exceeding average phoneme duration. However, in noise and reverberation environments under hard conditions, a further improvement in the performance is required.

In view of the aforementioned problems, it is an object of the present invention to provide a technique for extracting, from speech signals, features robuster to noise, reverberation, and the like so as to improve the accuracy of speech recognition.

The inventors have made researches so as to find features robuster to noise, reverberation, and the like and have found in an unobvious manner that, while many delta features including the delta of an MFCC and having been hitherto used could be considered as differences in the logarithmic domain, differences in the logarithmic domain brought undesirable results in speech recognition in reverberation and noise environments. Thus, the inventors have further made researches, and as a result, have hit upon the idea of using a difference in the linear domain and solving, by performing normalization in which the average of spectra of overall speech is used, problems newly caused by the use of a difference in the linear domain. The problems include, for example, a problem of a difference in the linear domain being unsuitable for modeling due to a wide dynamic range and a problem of inability to correct transfer characteristics.

To solve the aforementioned problems, a first aspect of the present invention provides a speech feature extraction apparatus including first difference calculation means for receiving, as an input, a spectrum of a speech signal segmented into frames for each frequency bin and calculating, for each frame, a difference of the spectrum between continuous frames for the frequency bin as a delta spectrum, and first normalization means for performing, for the frame, normalization of the delta spectrum for the frequency bin by dividing the delta spectrum by a function of an average spectrum that is an average of spectra through all frames that are overall speech for the frequency bin. An output of the first normalization means is defined as a delta feature.

In this case, the function of the average spectrum may be the average spectrum.

Preferably, the aforementioned speech feature extraction apparatus further includes first mel filter bank processing means for calculating, for the frame, a total of respective products of the normalized delta spectra for the individual frequency bins and corresponding weights of a mel filter bank as a normalized mel delta spectrum for each filter bank, and an output of the first mel filter bank processing means is defined as a delta feature.

More preferably, the aforementioned speech feature extraction apparatus further includes first discrete cosine transform means for performing discrete cosine transform of the normalized mel delta spectrum for the filter bank, and an output of the first discrete cosine transform means is defined as a delta feature.

Preferably, the first normalization means performs the normalization by performing logarithmic compression in addition to the division.

When the robustness against wide-band noise needs to be improved, the first mel filter bank processing means preferably uses, instead of the weights of the mel filter bank, a product of a filter and each of the weights of the mel filter bank, the filter having a weight in a harmonic structure portion in a voice interval and is substantially flat in a voiceless interval with no harmonic structure.

Preferably, the aforementioned speech feature extraction apparatus further includes Mel-Frequency Cepstrum Coefficient (MFCC) calculation means for calculating an MFCC, and the MFCC is defined as a static feature.

An operation by the first mel filter bank processing means may be performed before an operation by the first normalization means. In this case, the first normalization means performs, for the frame, normalization of the mel delta spectrum for the filter bank by dividing the mel delta spectrum by a function of an average mel spectrum that is an average of mel spectra through all frames that are overall speech for the filter bank, and in the speech feature extraction apparatus, an output of the first normalization means may be defined as a delta feature.

Preferably, the function of the average mel spectrum is the average mel spectrum. Alternatively, for a given frame t and a given filter bank j, the function of the average mel spectrum may output a larger value or a value near a larger value, out of a mel spectrum for the filter bank j for the frame t and the average mel spectrum for the filter bank j.

Preferably, the aforementioned speech feature extraction apparatus, in which an output of the first normalization means is defined as a delta feature, further includes second difference calculation means for receiving the delta spectrum as an input and calculating, for the frame, a difference of the delta spectrum between continuous frames for the frequency bin as a delta-delta spectrum, second mel filter bank processing means for calculating, for the frame, a total of respective products of the delta-delta spectra for the individual frequency bins and corresponding weights of a mel filter bank as a mel delta-delta spectrum for each filter bank, and second normalization means for performing, for the frame, normalization of the mel delta-delta spectrum for the filter bank by dividing the mel delta-delta spectrum by the function of the average mel spectrum, and an output of the second normalization means is defined as a delta-delta feature.

Preferably, the aforementioned speech feature extraction apparatus further includes first discrete cosine transform means for performing discrete cosine transform of the normalized mel delta spectrum for the filter bank, and an output of the first discrete cosine transform means is defined as a delta feature.

More preferably, the aforementioned speech feature extraction apparatus, in which an output of the first discrete cosine transform means is defined as a delta feature, further includes second difference calculation means for receiving the delta spectrum as an input and calculating, for the frame, a difference of the delta spectrum between continuous frames for the frequency bin as a delta-delta spectrum, second mel filter bank processing means for calculating, for the frame, a total of respective products of the delta-delta spectra for the individual frequency bins and corresponding weights of a mel filter bank as a mel delta-delta spectrum for each filter bank, second normalization means for performing, for the frame, normalization of the mel delta-delta spectrum for the filter bank by dividing the mel delta-delta spectrum by the function of the average mel spectrum, and second discrete cosine transform means for performing discrete cosine transform of the normalized mel delta-delta spectrum for the filter bank, and an output of the second discrete cosine transform means is defined as a delta-delta feature.

To solve the aforementioned problems, a second aspect of the present invention provides a speech feature extraction apparatus including mel filter bank processing means for receiving, as an input, a sum of a spectrum of a speech signal segmented into frames in each frame and an average spectrum that is an average of spectra through all frames that are overall speech, calculating, for the frame, a product of the sum multiplied by a weight of a mel filter bank and summing up the products, logarithm calculation means for calculating, for the frame, a logarithm of an output of the mel filter bank processing means, discrete cosine transform means for performing, for the frame, discrete cosine transform of an output of the logarithm calculation means, and first difference calculation means for calculating, for the frame, a difference of an output of the discrete cosine transform means between continuous frames. An output of the first difference calculation means is defined as a delta feature.

To solve the aforementioned problems, a third aspect of the present invention provides a speech feature extraction apparatus including mel filter bank processing means for receiving, as an input, a spectrum of a speech signal segmented into frames in each frame and calculating, for the frame, a mel spectrum by multiplying the spectrum by a weight of a mel filter bank and summing up the products, average calculation means for receiving, as an input, the mel spectrum for the frame and calculating an average mel spectrum that is an average of the mel spectra through all frames that are overall speech, logarithm calculation means for calculating, for the frame, a logarithm of a sum of the mel spectrum and the average mel spectrum, discrete cosine transform means for performing, for the frame, discrete cosine transform of an output of the logarithm calculation means, and first difference calculation means for calculating, for the frame, a difference of an output of the discrete cosine transform means between continuous frames. An output of the first difference calculation means is defined as a delta feature.

Preferably, in the second and third aspects of the present invention, the aforementioned speech feature extraction apparatus further includes second difference calculation means for calculating, for the frame, a difference of an output of the first difference calculation means between continuous frames, and an output of the second difference calculation means is defined as a delta-delta feature.

While the present invention has been described as a speech feature extraction apparatus, the present invention may be considered as a speech feature extraction method for extracting a speech feature described above in a computation by a computer including a processor and a storage area, and a speech feature extraction program for extracting a speech feature described above, the speech feature extraction program being executed in a computer including a processor and a storage area. The present invention can be combined with a technique for removing reverberation, noise, and the like, for example, a front end method, as described above.

According to the present invention, instead of a known difference in the logarithmic domain, a difference in the linear domain can be used as the delta feature and delta-delta feature of speech. Thus, a feature robuster to reverberation and noise can be extracted. As a result, the accuracy of speech recognition is improved. Other advantageous effects of the present invention will be appreciated from the description of embodiments.

BRIEF DESCRIPTION OF THE DRAWINGS

FIG. 6(a) shows the functional components of a delta feature calculation unit in a speech feature extraction apparatus according to a first embodiment of the present invention.

FIG. 6(b) shows the functional components of a delta-delta feature calculation unit in the speech feature extraction apparatus according to the first embodiment of the present invention.

FIG. 9(a) is a flowchart showing an example of the flow of the process of extracting delta features in the delta feature calculation unit in the speech feature extraction apparatus according to the third embodiment of the present invention.

FIG. 9(b) is a flowchart showing an example of the flow of the process of extracting delta-delta features in the delta-delta feature calculation unit in the speech feature extraction apparatus according to the third embodiment of the present invention.

FIG. 13(a) is a flowchart showing an example of the flow of the process of extracting delta features in the delta feature calculation unit in the speech feature extraction apparatus according to the fourth embodiment of the present invention.

FIG. 13(b) is a flowchart showing an example of the flow of the process of extracting delta features in the delta feature calculation unit in the speech feature extraction apparatus according to the fifth embodiment of the present invention.

FIG. 16 is a table showing exemplary results of evaluation experiment 1 of the present invention in a reverberation environment.

FIG. 17 is a table showing exemplary results of evaluation experiment 2 of the present invention in a reverberation environment.

FIG. 18 is a table showing exemplary results of evaluation experiment of the present invention in a noise environment.

DETAILED DESCRIPTION OF THE PREFERRED EMBODIMENTS

The best mode for carrying out the present invention will now be described in detail on the basis of the drawings. However, the following embodiments do not restrict the invention claimed in the claims. Moreover, all combinations of features described in the embodiments are not necessarily mandatory for the problem-solving means of the invention. The same numbers are assigned to the same components throughout the description of the embodiments.

Before the components and operations of the present invention are described, the fact that known a delta feature in which a difference in the logarithmic domain is used brings undesirable results in speech recognition in reverberation and noise environments will first be described with reference to FIGS. 1 and 2. Then, regarding each of the environments, the fact that a difference in the linear domain, normalization proposed by the inventors in which the average of spectra is used being performed on the difference, is robust to noise, reverberation, and the like as compared with known arts will be described.

Figure 1:
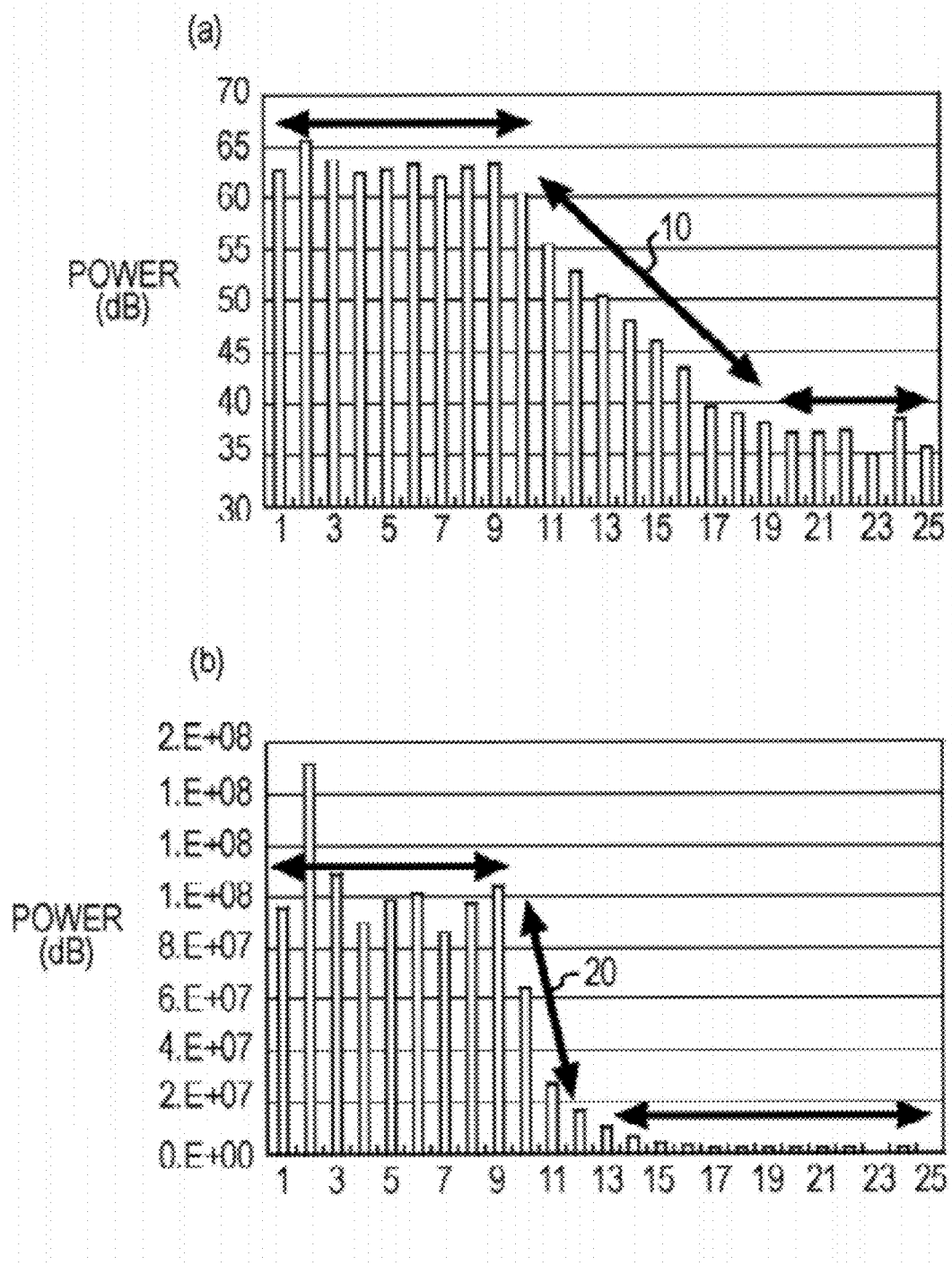
FIG. 1(a) is a graph on the logarithmic scale showing the attenuation of speech power recorded in a reverberant room.
FIG. 1(b) is a graph on the linear scale showing the attenuation of the same speech power as in FIG. 1(a).
Figure 2:
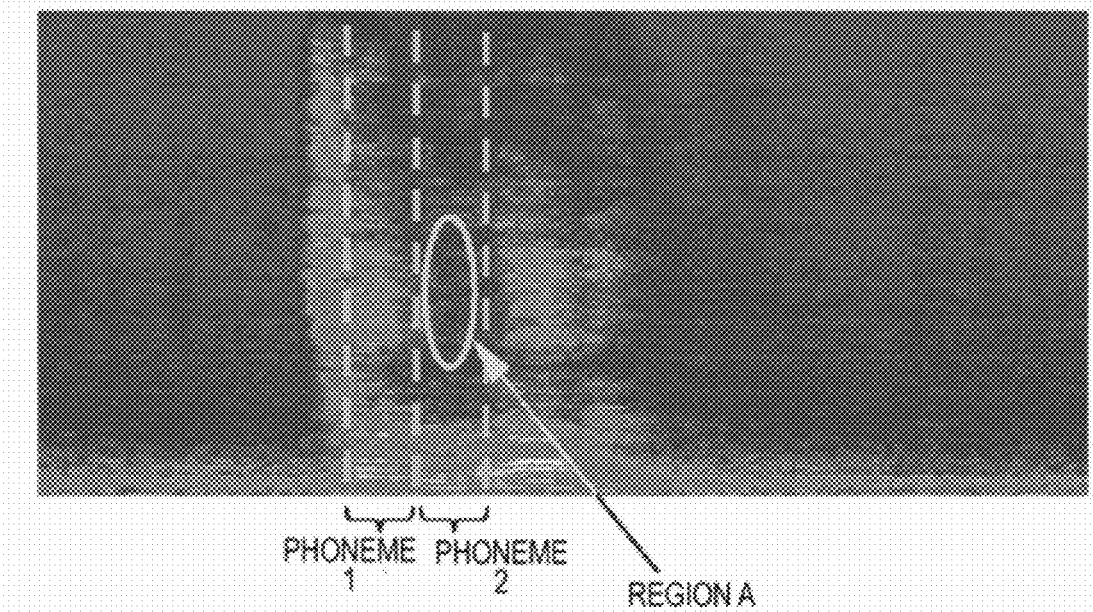
FIG. 2 shows exemplary speech spectra recorded in a reverberation environment.

(Reverberation Environment) FIG. 1 shows the attenuation of speech power recorded in a reverberant room. The same observational data is shown on the logarithmic scale in FIG. 1(a) and on the linear scale in FIG. 1(b). The respective abscissas represent interval numbers and correspond to the passage of time. FIG. 1 shows that the playback of speech ends around the ninth interval, and the following intervals are reverberation intervals. It is known that the power of reverberation exponentially attenuates. In FIG. 1(a) shown on the logarithmic scale, a long and constant slope 10 is formed. On the other hand, in FIG. 1(b) shown on the linear scale, a short and steep slope 20 is formed.

Hitherto, a difference of an MFCC between continuous frames has been frequently used as a delta feature. Since an MFCC is the result of performing discrete cosine transform of a logarithmic spectrum for each mel-scale filter bank (Mel-FB), the delta feature of the MFCC is considered as a difference in the logarithmic domain. Even in speech recognition apparatuses that do not use an MFCC as a feature, since many of the speech recognition apparatuses use a logarithmic spectrum or the linear transform of a logarithmic spectrum as a feature, the delta feature is also considered as a difference in the logarithmic domain.

Known methods for using a difference in the logarithmic domain as a delta feature in this manner correspond to using the gradient of the slope 10 in FIG. 1(*a*) as a delta feature. In the known methods, even after speech ends, a predetermined feature is continuously output for a long time. On the other hand, using a difference in the linear domain as a delta feature corresponds to using the gradient of the slope 20 in FIG. 1(*b*) as a delta feature. In this case, a delta feature is considered to rapidly attenuate in reverberation intervals.

The importance of rapid attenuation of a delta feature is more apparent in a case where phonemes are continuous. FIG. 2 shows exemplary speech spectra recorded in a reverberation environment. The abscissa represents interval numbers as in FIG. 1, and the ordinate represents frequencies. Moreover, the intensity of a speech spectrum is expressed by a color shade, and a lighter shade indicates a higher intensity. When phonemes 1 and 2 are continuous, as shown in FIG. 2, although a region A belongs to the phoneme 2, the region A is affected by the reverberation of the preceding phoneme 1. Since the spectrum intensity of the region A is sufficiently low, when only non-delta features, i.e., static features, are assumed, the influence of the preceding phoneme is not strong. However, when dynamic features, such as delta features in which logarithmic spectra are used, are also considered, the region A corresponds to the foot of a long slope representing the reverberation of the preceding phoneme 1 and thus is affected by the preceding phoneme 1 more than it seems to be. Thus, in a reverberation environment, delta features in the linear domain that rapidly attenuate are preferable.

However, a difference in the linear domain cannot be directly used as a delta feature. This is because a delta in the linear domain has a wide dynamic range and thus is not suitable for modeling. In this case, a logarithm may be calculated after a delta in the linear domain is calculated so as to compress the dynamic range. However, since the value of a delta may be positive or negative, the logarithm cannot be calculated in a simple manner. Moreover, in speech recognition, in many cases, Cepstrum Mean Normalization (CMN) is used at the same time so as to correct transfer characteristics. Such correction cannot be performed, using a delta in the linear domain directly.

Thus, the inventors solve the aforementioned problems by normalizing the delta of a spectrum in the linear domain, using the average of spectra through overall speech. Assuming that the delta of a spectrum in the linear domain at the tth frame of observed speech is $\Delta s_t$, and the average of spectra through all frames that are the overall speech (hereinafter also simply called an average spectrum) is $\bar{s}$, the simplest delta feature proposed by the inventors is expressed by the following formula. Other various types of delta features proposed by the inventors will be described later.

$$\Delta \hat{s}_t = \frac{\Delta s_t}{\bar{s}} \qquad \text{[Formula 1]}$$

Here, for the purpose of comparison, the known delta of a spectrum in the logarithmic domain at the tth frame of observed speech is approximated by the following formula.

$$\Delta(\log s_t) \approx \frac{\partial}{\partial S} \log(s_t) \cdot \Delta s_t \qquad \text{[Formula 2]}$$
$$= \frac{\Delta s_t}{s_t}$$

Comparing formula 1 with formula 2, the delta feature proposed by the inventors can be considered as the result of replacing a spectrum $s_t$ that is the denominator of the known delta feature with an average spectrum $\bar{s}$ of overall speech. Thus, the delta feature proposed by the inventors provides a smaller delta feature than the known delta feature when power at the tth frame is small compared with that through overall speech. In this case, since the aforementioned formulae are similar to each other, formula 1 can be considered to fall within a dynamic range substantially the same as that of formula 2. Moreover, the delta feature in formula 1 is divided by $\bar{s}$ and thus includes the effect of correction of transfer characteristics.

(Noise Environment) The fact that the delta feature proposed by the inventors is also effective in a noise environment will next be described, taking formula 1 as an example. It is assumed that there is no noise in learning an acoustic model, and the learning is performed, using the respective delta features in formulae 1 and 2. In a situation in which noise N is added when speech recognition is performed, the delta feature in formula 1 is observed as the following formula.

$$\Delta \hat{s}_{tNoisy} = \frac{\Delta s_t}{\bar{s} + N} \qquad \text{[Formula 3]}$$

Similarly, the delta feature in formula 2 is observed as the following formula.

$$\Delta(\log s_t)_{Noisy} = \frac{\Delta s_t}{s_t + N}$$

Here, for the purpose of examining the degree of variation due to addition of the noise N, the ratio between formulae 1 and 3 and the ratio between formulae 2 and 4 are calculated and shown respectively in formulae 5 and 6.

$$\frac{\Delta \hat{s}_{tNoisy}}{\Delta \hat{s}_t} = 1 + \frac{N}{\bar{s}} \qquad \text{[Formula 5]}$$

$$\frac{\Delta(\log s_t)_{Noisy}}{\Delta(\log s_t)} \approx 1 + \frac{N}{s_t} \qquad \text{[Formula 6]}$$

Comparison of formula 5 with formula 6 shows that, in a frame in which a local SNR is low, i.e., an interval in which $s_t$ is much smaller than the noise N or the average spectrum $\bar{s}$, the degree of variation of a delta feature due to addition of the noise N is larger in formula 6 than in formula 5. This means that a deviation from a model occurring in a low-SNR interval in which erroneous recognition is generally considered to be likely to occur is much larger in the use of the known delta in the logarithmic domain than in the use of the delta feature proposed by the inventors. Accordingly, the delta feature proposed by the inventors is also effective in a noise environment.

Figure 3:
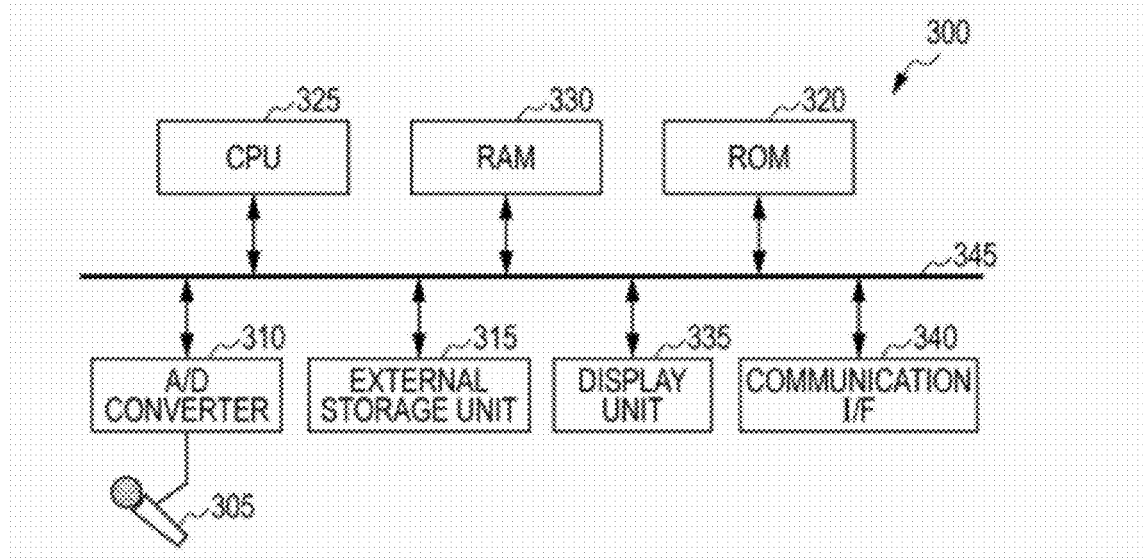
FIG. 3 is a diagram showing an exemplary hardware configuration of a computer suitable for implementing a speech feature extraction apparatus according to an embodiment of the present invention.

FIG. 3 shows an exemplary hardware configuration of a computer 300 for carrying out the present invention. In FIG. 3, a sound generated around a microphone 305 is input to an A/D converter 310 as an analog signal via the microphone 305. In the ND converter 310, the analog signal is converted to a digital signal that can be processed by a CPU 325.

Sounds picked up by the microphone 305 include, for example, in the case of a car navigation system, not only the speaking voice of a driver and the speaking voice of a fellow passenger but also the air blowing sounds of an air conditioner, sounds output from a car audio system, engine sounds, and the sounds of a klaxon. In a case where a window of a vehicle is open, the sounds picked up by the microphone 305 further include, for example, noise from an oncoming vehicle and the speaking voice of a passerby.

For example, the code of a plurality of computer programs and various types of data can be recorded in an external storage unit 315, a ROM 320, and the like. The plurality of computer programs includes a speech feature extraction program module cooperating with an operating system to give instructions to the CPU 325 so as to carry out the present invention. Each of the plurality of computer programs stored in the external storage unit 315, the ROM 320, and the like is executed by the CPU 325 by being loaded into a RAM 330. The external storage unit 315 is connected to a bus 345 via a controller (not shown) such as an SCSI controller.

A computer program can be compressed and recorded in a plurality of media after being divided into multiple pieces. The details of an operation to be performed, by the CPU 325, using a speech feature extraction program, on a digital signal transferred from the A/D converter 310 are described below.

The computer 300 further includes a display unit 335 for presenting visual data to users. The display unit 335 is connected to the bus 345 via a graphics controller (not shown). The computer 300 can be connected to a network via a communication interface 340 and be capable of communicating with another computer and the like.

The components described above are just exemplifications, and all the components are not the essential components of the present invention. Similarly, the computer 300 for carrying out the present invention may include input devices such as a keyboard and a mouse and other components such as a speaker.

Figure 4:
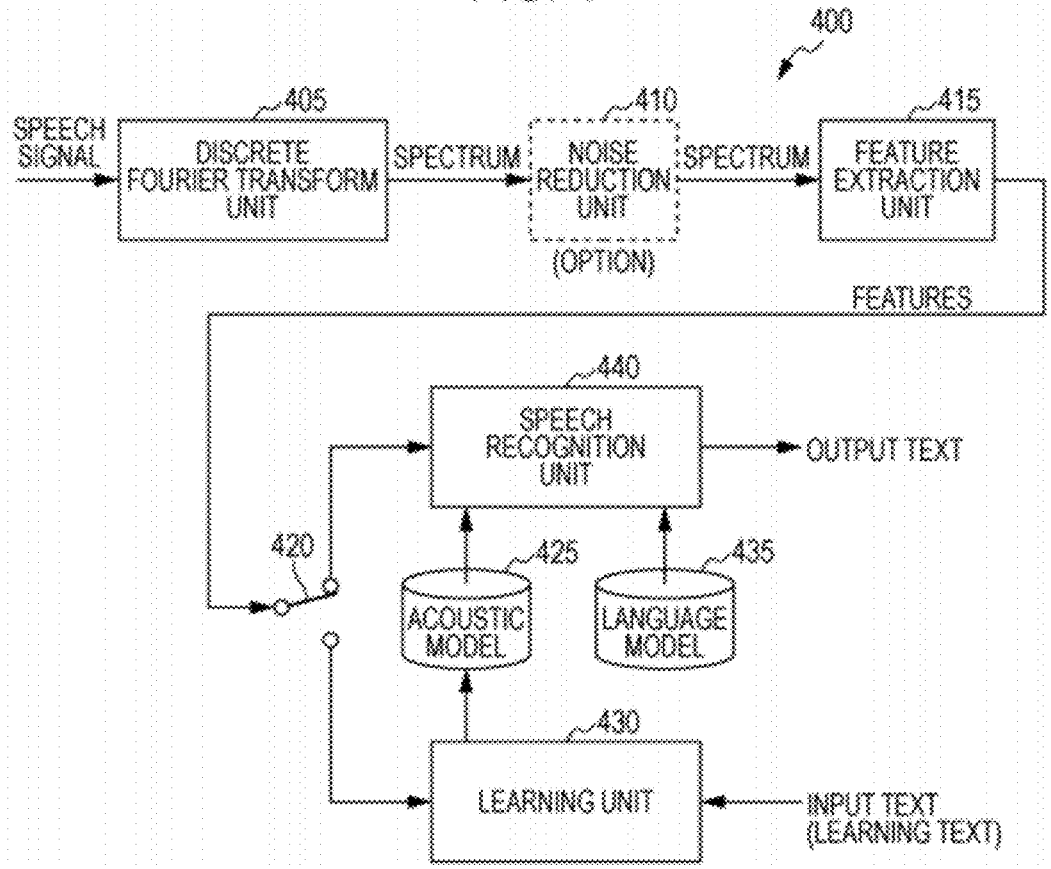
FIG. 4 shows an example of the configuration of a general speech recognition apparatus.

FIG. 4 shows the configuration of a general speech recognition apparatus 400. A speech signal having been converted to a digital signal is input to a discrete Fourier transform unit 405, and the discrete Fourier transform unit 405 segments the input speech signal into frames by an appropriate way such as the Hanning window or the Hamming window and then performs discrete Fourier transform to output the spectrum of the speech signal. The spectrum output from the discrete Fourier transform unit 405 is input to a noise reduction unit 410, and the noise reduction unit 410 removes noise from the spectrum by, for example, the spectral subtraction method. However, the noise reduction unit 410 is an option and may exist or not.

The spectrum of a speech signal (in a case where the noise reduction unit 410 exists, the spectrum of a speech signal, from which noise has been removed) is input to a feature extraction unit 415, and the feature extraction unit 415 extracts and outputs, for example, a static feature and a dynamic feature. Hitherto, a combination of an MFCC and the delta (first order variation) and delta delta (second order variation) of the MFCC or the results of linear transformation of these values have been frequently used, as described above, and extracted as a static feature and a dynamic feature.

At the time of learning, a switch 420 is turned to a position on the side of a learning unit 430. Then, features extracted from speech signals as learning data by the feature extraction unit 415 and an input text corresponding to the speech signals as the learning data are input to the learning unit 430, and the learning unit 430 constructs an acoustic model 425 on the basis of these pieces of data. Since the learning process is not the subject of the present invention, further description is omitted.

Moreover, at the time of recognition, the switch 420 is turned to a position on the side of a speech recognition unit 440. Then, features extracted from speech signals as recognition data by the feature extraction unit 415 and data from the acoustic model 425 and a language model 435 are input to the speech recognition unit 440, and the speech recognition unit 440 recognizes the speech signals on the basis of these pieces of data to output a text of the recognition result. Since the speech recognition process is not the subject of the present invention, further description is omitted.

In this manner, the speech recognition apparatus 400 constructs the acoustic model 425 from speech signals and an input text at the time of learning and outputs a text of the recognition result on the basis of input signals, the acoustic model, and the language model at the time of recognition. The present invention improves the known feature extraction unit 415 shown in FIG. 4, and specifically, improves methods for calculating delta features and delta-delta features that are dynamic features.

As is the case with a large number of the known feature extraction units 415, the feature extraction unit 415 improved by the present invention outputs multidimensional features in which static features and dynamic features are combined. Naturally, the feature extraction unit 415 improved by the present invention may be simply configured, for example, not to include static features or not to include delta-delta features, as necessary. Hereinafter, the description will be given, assuming that the feature extraction unit 415 of the present invention is a speech feature extraction apparatus including a static feature calculation unit, a delta feature calculation unit, and a delta-delta feature calculation unit.

Figure 5:
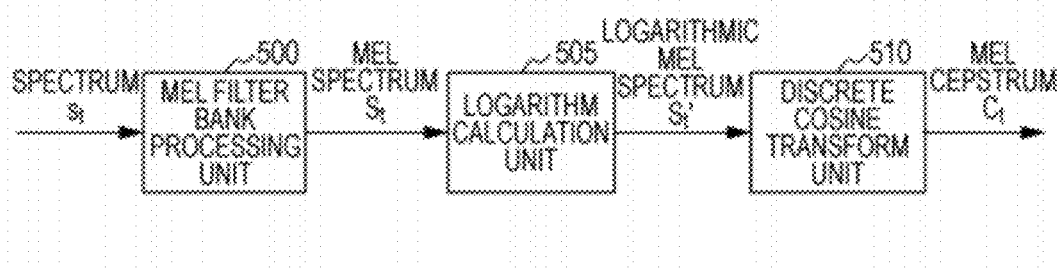
FIG. 5 shows exemplary functional components of a static feature calculation unit.

FIG. 5 shows exemplary functional components of a static feature calculation unit. In the embodiments, MFCC features are used as static features. The static feature calculation unit is common to all speech feature extraction apparatuses according to first to fifth embodiments described below. In FIG. 5, the spectrum $s_t$ of a speech signal segmented into frames for each frequency bin is input to a mel filter bank processing unit 500 from the discrete Fourier transform unit 405 or the noise reduction unit 410, which have been described in relation to FIG. 4. Then, for each frame, the mel filter bank processing unit 500 transforms, using the function, the spectrum $s_t$ for each frequency bin into a spectrum for each filter bank (hereinafter called a mel spectrum $S_t$), using the weight of the mel filter bank, to output the mel spectrum $S_t$.

Assuming that t is a frame number, i is a frequency bin number, j is a filter bank number, and Mel_FB_Weight is the weight of a mel filter bank, the transformation by the mel filter bank processing unit 500 is expressed by the following formula.

$$S_t(j) = \sum_i s_t(i) \cdot \text{Mel\_FB\_Weight}(j, i) \quad \text{[Formula 7]}$$

The mel spectrum $S_t$ is input to a logarithm calculation unit 505. Then, for each frame, the logarithm calculation unit 505 calculates the logarithm of the mel spectrum $S_t$ for each filter bank according to the following formula, using the function, to output a logarithmic mel spectrum $S_t'$.

$$S_t'(j) = \log(S_t(j)) \quad \text{[Formula 8]}$$

The logarithmic mel spectrum $S_t'$ is input to a discrete cosine transform unit 510. Then, for each frame, the discrete cosine transform unit 510 performs discrete cosine transform of the logarithmic mel spectrum $S_t'$, using the function, to calculate and output an MFCC, i.e., a mel cepstrum $C_t$. In this case, assuming that a discrete cosine transform matrix is $D(h,j)$, the discrete cosine transform unit 510 performs discrete cosine transform of the logarithmic mel spectrum $S_t'$ according to the following formula.

$$C_t(h) = \sum_j D(h, j) S_t'(j) \quad \text{[Formula 9]}$$

$$D(h, j) = \sqrt{\frac{2}{n}} K_h \cos\left(\frac{(h-1)\left(j-\frac{1}{2}\right)}{n}\pi\right)$$

$$\begin{cases} K_h = \frac{1}{\sqrt{2}}, & h = 0 \\ K_h = 1, & h \neq 0 \end{cases}$$

In this manner, the static feature calculation unit receives the spectrum $s_t$ as the input and finally outputs the mel cepstrum $C_t$ as a static feature.

(First Embodiment) FIG. 6(a) shows the functional components of a delta feature calculation unit in a speech feature extraction apparatus according to a first embodiment of the present invention. The spectrum $s_t$ of a speech signal segmented into frames for each frequency bin is input to a first difference calculation unit 600 from the discrete Fourier transform unit 405 or the noise reduction unit 410, which have been described in relation to FIG. 4. Then, for each frame, the first difference calculation unit 600 calculates, using the function, a difference of the spectrum $s_t$ between continuous frames for each frequency bin (hereinafter also called a delta spectrum $\Delta s_t$) to output the difference as the delta spectrum $\Delta s_t$ for each frequency bin. The difference processing by the first difference calculation unit 600 is performed according to the following formula.

$$\Delta s_t = \frac{\sum_{\theta=1}^{\Theta} \theta(s_{t+\theta} - s_{t-\theta})}{2\sum_{\theta=1}^{\Theta} \theta^2} \quad \text{[Formula 10]}$$

In formula 10, the frequency bin number i is omitted.

The delta spectrum $\Delta s_t$ for each frequency bin is input to a first normalization unit 605. Then, for each frame, the first normalization unit 605 normalizes, using the function, the delta spectrum $\Delta s_t$ for each frequency bin by dividing the delta spectrum $\Delta s_t$ by a function F of an average spectrum that is the average of spectra through all frames that are overall speech for the frequency bin. In the embodiment, it is assumed that the function F of an average spectrum is the average spectrum, i.e., the average spectrum $\bar{s}$ for each frequency bin. In this case, the output of the first normalization unit 605 is expressed by the following formula.

$$\Delta \hat{s}_t = \frac{\Delta s_t}{\bar{s}} \quad \text{[Formula 11]}$$

In formula 11, the frequency bin number i is omitted. In the delta feature calculation unit in the speech feature extraction apparatus according to the first embodiment, the output of the first normalization unit 605 is defined as a delta feature.

FIG. 6(b) shows the functional components of a delta-delta feature calculation unit in the speech feature extraction apparatus according to the first embodiment of the present invention. The delta-delta feature calculation unit in the speech feature extraction apparatus according to the first embodiment of the present invention includes a second difference calculation unit 610 and a second normalization unit 615. Each of these components has the same function as a corresponding component in the delta feature calculation unit in the speech feature extraction apparatus according to the first embodiment of the present invention except that the input and output differ.

That is, the delta spectrum $\Delta s_t$ is input to the second difference calculation unit 610 from the first difference calculation unit 600 shown in FIG. 6(a). Then, for each frame, the second difference calculation unit 610 calculates a difference of the delta spectrum $\Delta s_t$ between continuous frames for each frequency bin as a delta-delta spectrum $\Delta\Delta s_t$. The delta-delta spectrum $\Delta\Delta s_t$, which is the output of the second difference calculation unit 610, is expressed by the following formula.

$$\Delta\Delta s_t = \frac{\sum_{\theta=1}^{\Theta} \theta(\Delta s_{t+\theta} - \Delta s_{t-\theta})}{2\sum_{\theta=1}^{\Theta} \theta^2} \quad \text{[Formula 12]}$$

In formula 12, the frequency bin number i is omitted.

Moreover, the delta-delta spectrum $\Delta\Delta s_t$ is input to the second normalization unit 615. Then, for each frame, the second normalization unit 615 normalizes the delta-delta spectrum $\Delta\Delta s_t$ for each frequency bin by dividing the delta-delta spectrum $\Delta\Delta s_t$ by a function of an average spectrum. In the embodiment, it is assumed than the function F of an average spectrum is the average spectrum, i.e., the average spectrum $\bar{s}$ for each frequency bin. In this case, the output of the second normalization unit 615 is expressed by the following formula.

$$\Delta\Delta \hat{s}_t = \frac{\Delta\Delta s_t}{\bar{s}} \quad \text{[Formula 13]}$$

In formula 13, the frequency bin number i is omitted. In the delta-delta feature calculation unit in the speech feature extraction apparatus according to the first embodiment, the output of the second normalization unit 615 is defined as a delta-delta feature.

(Second Embodiment) FIG. 7(a) shows the functional components of a delta feature calculation unit in a speech feature extraction apparatus according to a second embodiment of the present invention. The delta feature calculation unit in the speech feature extraction apparatus according to the second embodiment is that in which a first mel filter bank processing unit 705 is added to the delta feature calculation unit in the speech feature extraction apparatus according to the first embodiment. The newly added first mel filter bank processing unit 705 is disposed in a position such that an operation by the first mel filter bank processing unit 705 follows an operation by a first difference calculation unit 700 and precedes or follows an operation by a first normalization unit 710.

In this case, since the first difference calculation unit 700 is exactly the same as the first difference calculation unit 600 in the speech feature extraction apparatus according to the first embodiment, the description is omitted to avoid the repetition. The first mel filter bank processing unit 705 has the same function as the mel filter bank processing unit 500 described in relation to FIG. 5 except that the input and output differ.

That is, taking, as an example, a case where an operation by the first mel filter bank processing unit 705 precedes an operation by the first normalization unit 710, the delta spectrum $\Delta s_t$ is input to the first mel filter bank processing unit 705 from the first difference calculation unit 700. Then, for each frame, the first mel filter bank processing unit 705 multiples the delta spectrum $\Delta s_t$ for each frequency bin by the weight of a mel filter bank, as is the case with the right side of formula 7, to add up the products and calculate the total as a mel delta spectrum $\Delta S_t$ for each filter bank.

Moreover, the first normalization unit 710 has the same function as the first normalization unit 605 in the speech feature extraction apparatus according to the first embodiment except that the input and output differ. Thus, the description is omitted to avoid the repetition. In this case, it should be noted that, when an operation by the first mel filter bank processing unit 705 precedes an operation by the first normalization unit 710, the average spectrum of all frames that are overall speech to be used by the first normalization unit 710 for normalization is not the average spectrum $\bar{s}$, which is the average of spectra for each frequency bin, but an average mel spectrum $\bar{S}$ that is the average of mel spectra for each filter bank.

It is assumed that the function F of an average spectrum is the average spectrum. In this case, the mel delta spectrum $\Delta S_t$ for each filter bank is input to the first normalization unit 710 from the first mel filter bank processing unit 705. Then, for each frame, the first normalization unit 710 normalizes the mel delta spectrum $\Delta S_t$ for each filter bank by dividing the mel delta spectrum $\Delta S_t$ by the average mel spectrum $\bar{S}$ of all frames for the filter bank. The output of the first normalization unit 710 is expressed by the following formula.

$$\Delta \hat{S}_t = \frac{\Delta S_t}{\bar{S}} \quad [\text{Formula 14}]$$

In formula 14, the filter bank number j is omitted. Moreover, a denominator in the right side of formula 14 is the average mel spectrum $\bar{S}$ for each filter bank. In the delta feature calculation unit in the speech feature extraction apparatus according to the second embodiment, the output of one of the first mel filter bank processing unit 705 and the first normalization unit 710, which finally performs an operation, is defined as a delta feature.

Figure 7:
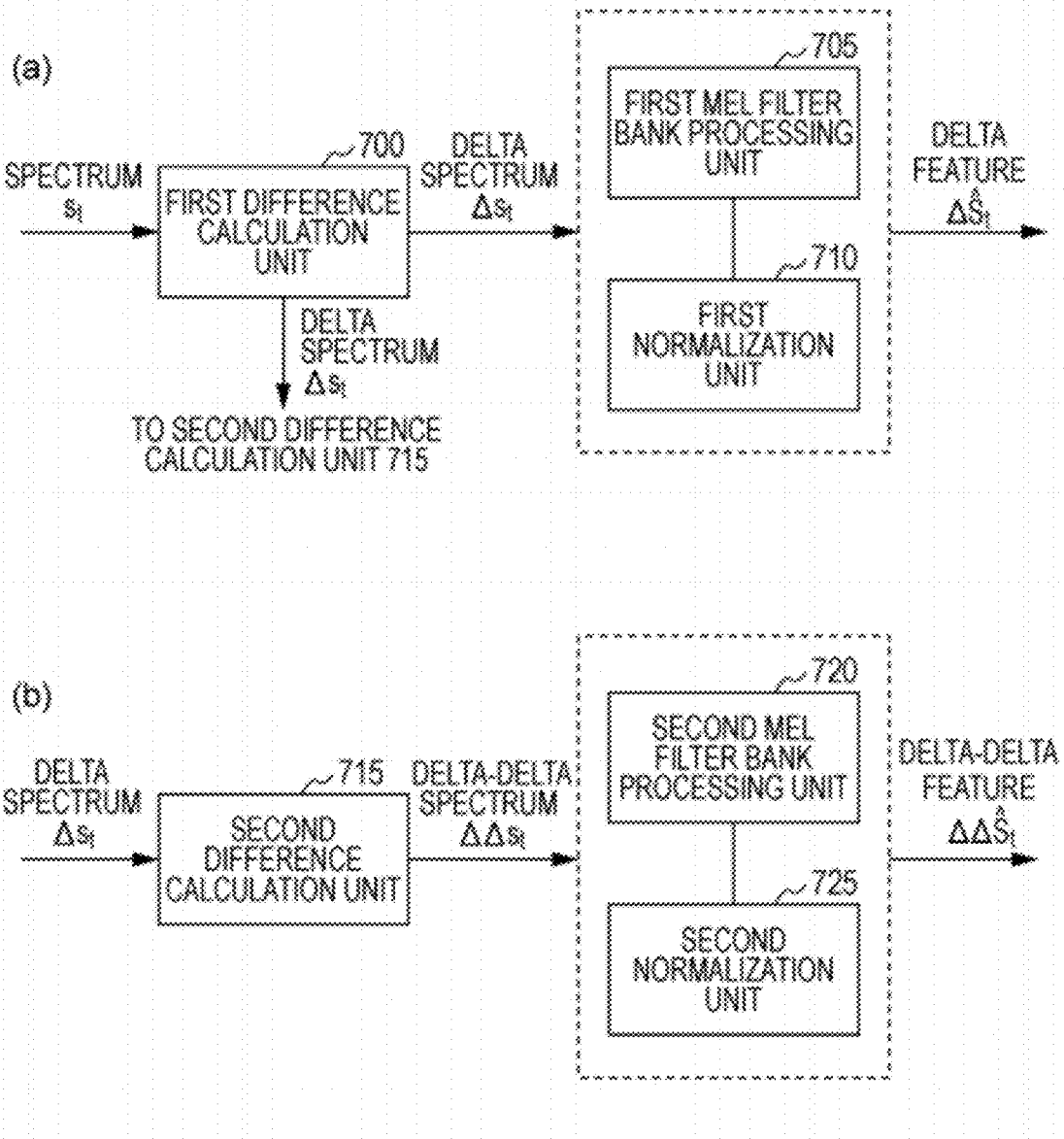
FIG. 7(a) shows the functional components of a delta feature calculation unit in a speech feature extraction apparatus according to a second embodiment of the present invention.
FIG. 7(b) shows the functional components of a delta-delta feature calculation unit in the speech feature extraction apparatus according to the second embodiment of the present invention.

FIG. 7(*b*) shows the functional components of a delta-delta feature calculation unit in the speech feature extraction apparatus according to the second embodiment of the present invention. The delta-delta feature calculation unit in the speech feature extraction apparatus according to the second embodiment of the present invention includes a second difference calculation unit 715, a second mel filter bank processing unit 720, and a second normalization unit 725. An operation by the second mel filter bank processing unit 720 may precede an operation by the second normalization unit 725, or vice versa. Since the second difference calculation unit 715 is exactly the same as the second difference calculation unit 610 in the speech feature extraction apparatus according to the first embodiment, the description is omitted to avoid the repetition. The second mel filter bank processing unit 720 has the same function as the mel filter bank processing unit 500 described in relation to FIG. 5 except that the input and output differ.

That is, taking, as an example, a case where an operation by the second mel filter bank processing unit 720 precedes an operation by the second normalization unit 725, the delta-delta spectrum $\Delta\Delta s_t$ is input to the second mel filter bank processing unit 720 from the second difference calculation unit 715. Then, for each frame, the second mel filter bank processing unit 720 multiples the delta-delta spectrum $\Delta\Delta s_t$ for each frequency bin by the weight of a mel filter bank, as is the case with the right side of formula 7, to add up the products and calculate the total as a mel delta-delta spectrum $\Delta\Delta S_t$ for each filter bank.

Moreover, the second normalization unit 725 has the same function as the second normalization unit 615 in the speech feature extraction apparatus according to the first embodiment except that the input and output differ. Thus, the description is omitted to avoid the repetition. In this case, it should be noted that, when an operation by the second mel filter bank processing unit 720 precedes an operation by the second normalization unit 725, the average spectrum of all frames that are overall speech to be used by the second normalization unit 725 for normalization is not the average spectrum $\bar{s}$, which is the average of spectra for each frequency bin, but the average mel spectrum $\bar{S}$, which is the average of mel spectra for each filter bank.

It is assumed that the function F of an average spectrum is the average spectrum. In this case, the mel delta-delta spectrum $\Delta\Delta S_t$ for each filter bank is input to the second normalization unit 725 from the second mel filter bank processing unit 720. Then, for each frame, the second normalization unit 725 normalizes the mel delta-delta spectrum $\Delta\Delta S_t$ for each filter bank by dividing the mel delta-delta spectrum $\Delta\Delta S_t$ by the average mel spectrum $\bar{S}$ for the filter bank. The output of the second normalization unit 725 is expressed by the following formula.

$$\Delta\Delta \hat{S}_t = \frac{\Delta\Delta S_t}{\bar{S}} \quad [\text{Formula 15}]$$

In formula 15, the filter bank number j is omitted. Moreover, a denominator in the right side of formula 15 is the average mel spectrum $\bar{S}$ for each filter bank. In the delta-delta feature calculation unit in the speech feature extraction apparatus according to the second embodiment, the output of one of the second mel filter bank processing unit 720 and the second normalization unit 725, which finally performs an operation, is defined as a delta-delta feature.

Figure 8:
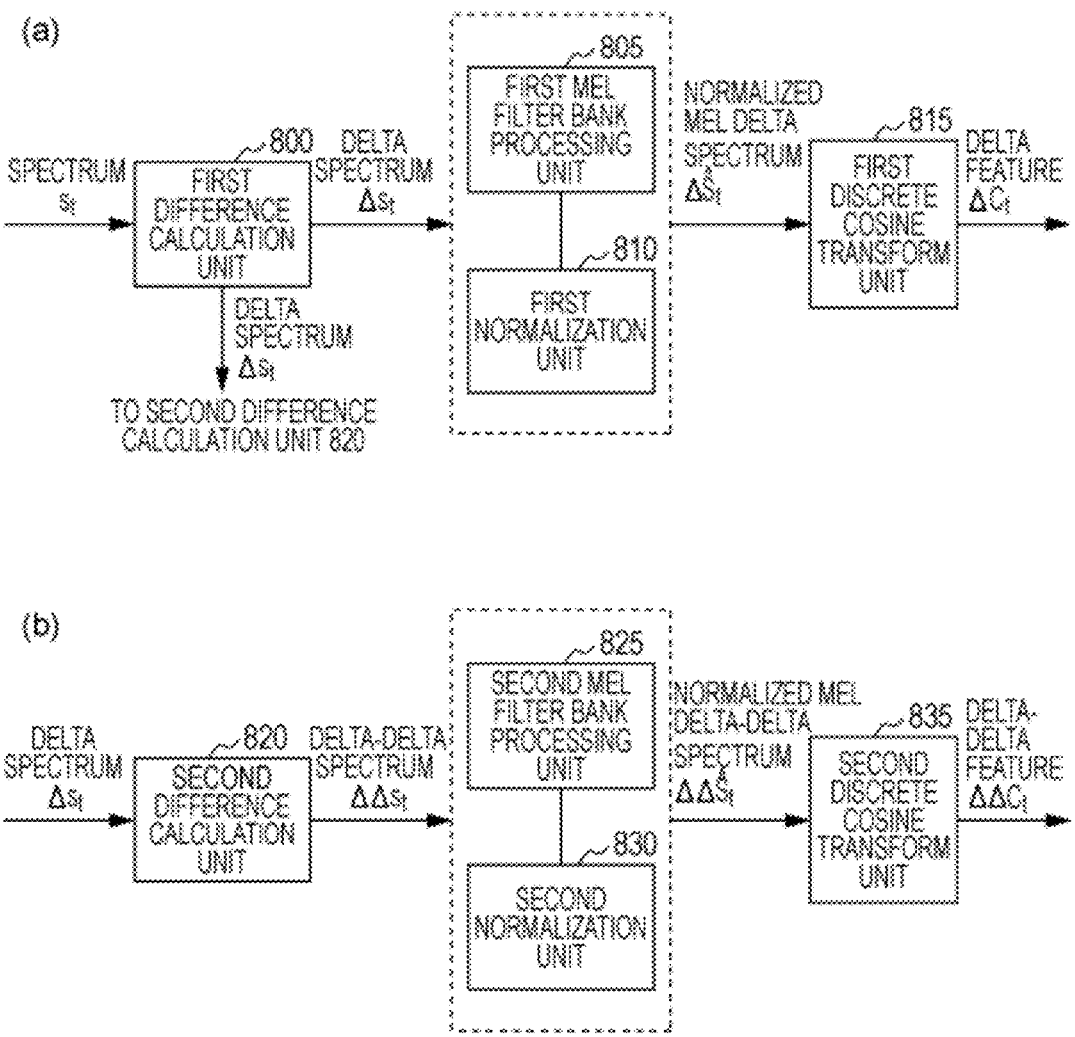
FIG. 8(a) shows the functional components of a delta feature calculation unit in a speech feature extraction apparatus according to a third embodiment of the present invention.
FIG. 8(b) shows the functional components of a delta-delta feature calculation unit in the speech feature extraction apparatus according to the third embodiment of the present invention.

(Third Embodiment) FIG. 8(*a*) shows the functional components of a delta feature calculation unit in a speech feature extraction apparatus according to a third embodiment of the present invention. The delta feature calculation unit in the speech feature extraction apparatus according to the third embodiment is that in which a first discrete cosine transform unit 815 is newly added to the delta feature calculation unit in the speech feature extraction apparatus according to the second embodiment. Thus, the description of a first difference calculation unit 800, a first mel filter bank processing unit 805, and a first normalization unit 810 is omitted to avoid the repetition. In this case, the newly added first discrete cosine transform unit 815 is disposed in a position such that the first discrete cosine transform unit 815 finally performs an operation.

The first discrete cosine transform unit 815 has the same function as the discrete cosine transform unit 510 described in relation to FIG. 5 except that the input and output differ. That is, the normalized mel delta spectrum $\Delta \hat{S}_t$ for each filter bank is input to the first discrete cosine transform unit 815. Then, the first discrete cosine transform unit 815 performs discrete cosine transform of the normalized mel delta spectrum $\Delta \hat{S}_t$. The output of the first discrete cosine transform unit 815 is expressed by the following formula.

$$\Delta C_t = \text{DCT}(\Delta \hat{S}_t) \quad \text{[Formula 16]}$$

In formula 16, symbol DCT represents transformation by the discrete cosine transform matrix D(h,j) in formula 9. In the delta feature calculation unit in the speech feature extraction apparatus according to the third embodiment, the output of the first discrete cosine transform unit 815 is defined as a delta feature.

FIG. 8(b) shows the functional components of a delta-delta feature calculation unit in the speech feature extraction apparatus according to the third embodiment of the present invention. The delta-delta feature calculation unit in the speech feature extraction apparatus according to the third embodiment of the present invention is that in which a second discrete cosine transform unit 835 is newly added to the delta-delta feature calculation unit in the speech feature extraction apparatus according to the second embodiment. Thus, the description of a second difference calculation unit 820, a second mel filter bank processing unit 825, and a second normalization unit 830 is omitted to avoid the repetition. In this case, the newly added second discrete cosine transform unit 835 is disposed in a position such that the second discrete cosine transform unit 835 finally performs an operation.

The second discrete cosine transform unit 835 has the same function as the discrete cosine transform unit 510 described in relation to FIG. 5 except that the input and output differ. That is, the normalized mel delta-delta spectrum $\Delta\Delta \hat{S}_t$ for each filter bank is input to the second discrete cosine transform unit 835. Then, the second discrete cosine transform unit 835 performs discrete cosine transform of the normalized mel delta-delta spectrum $\Delta\Delta \hat{S}_t$. The output of the second discrete cosine transform unit 835 is expressed by the following formula.

$$\Delta\Delta C_t = \text{DCT}(\Delta\Delta \hat{S}_t) \quad \text{[Formula 17]}$$

In formula 17, symbol DCT represents transformation by the discrete cosine transform matrix D(h,j) in formula 9. In the delta-delta feature calculation unit in the speech feature extraction apparatus according to the third embodiment, the output of the second discrete cosine transform unit 835 is defined as a delta-delta feature.

In the delta feature calculation unit and the delta-delta feature calculation unit in the speech feature extraction apparatus according to the third embodiment, the method for normalization by the first normalization unit 810 and the second normalization unit 830 may be changed in the following manner. That is, the first normalization unit 810 and the second normalization unit 830 may perform normalization by performing logarithmic compression in addition to division in which the average spectrum $\bar{s}$ and the average mel spectrum $\bar{S}$ are used. In this case, for example, when an operation by the first normalization unit 810 is performed after an operation by the first mel filter bank processing unit 805, normalization by the first normalization unit 810 is performed according to the following formula.

$$\begin{cases} \Delta \hat{S}_t = \log\left(\frac{\Delta S_t}{\bar{S}} + 1\right), & \Delta S_t \geq 0 \\ \Delta \hat{S}_t = -\log\left(-\frac{\Delta S_t}{\bar{S}} + 1\right), & \text{other } \Delta S_t \end{cases} \quad \text{[Formula 18]}$$

That is, when the mel delta spectrum $\Delta S_t$ is equal to or more than zero, the first normalization unit 810 normalizes the mel delta spectrum $\Delta S_t$ for each filter bank by dividing the mel delta spectrum $\Delta S_t$ by the average mel spectrum $\bar{S}$ for the filter bank, adding one to the quotient, and then calculating the logarithm of the sum. On the other hand, when the mel delta spectrum $\Delta S_t$ is less than zero, the first normalization unit 810 normalizes the mel delta spectrum $\Delta S_t$ for each filter bank by dividing the mel delta spectrum $\Delta S_t$ by the average mel spectrum $\bar{S}$ for the filter bank, multiplying the quotient by minus one, adding one to the product, and then multiplying the logarithm of the sum by minus one. Similarly, when an operation by the second normalization unit 830 is performed after an operation by the second mel filter bank processing unit 825, the second normalization unit 830 may perform normalization according to formula 19.

$$\begin{cases} \Delta\Delta \hat{S}_t = \log\left(\frac{\Delta\Delta S_t}{\bar{S}} + 1\right), & \Delta S_t \geq 0 \\ \Delta\Delta \hat{S}_t = -\log\left(-\frac{\Delta\Delta S_t}{\bar{S}} + 1\right), & \text{other } \Delta S_t \end{cases} \quad \text{[Formula 19]}$$

In the delta feature calculation unit and the delta-delta feature calculation unit in the speech feature extraction apparatus according to the third embodiment, the function F of the average mel spectrum $\bar{S}$ may not be the average mel spectrum $\bar{S}$ but the function F of the average mel spectrum $\bar{S}$ and the mel spectrum S described below. That is, for a given frame t and a given filter bank j, the function F of the average mel spectrum $\bar{S}$ outputs a larger value or a value near a larger value, out of the mel spectrum S for the filter bank j for the frame t and the average mel spectrum $\bar{S}$ of all frames for the filter bank j. Examples of such a function F are shown in formulae 20 and 21.

$$F(\bar{S}, S_t) = \max(\bar{S}, S_t) \quad \text{[Formula 20]}$$

$$F(\bar{S}, S_t) = (\bar{S} + S_t) \quad \text{[Formula 21]}$$

In formulas 20 and 21, the filter bank number j is omitted.

Then, the mel delta spectrum $\Delta S_t$ for each filter bank is input to the first normalization unit 810. Then, for each frame, the first normalization unit 810 normalizes the mel delta spectrum $\Delta S_t$ for each filter bank by dividing the mel delta spectrum $\Delta S_t$ by the function F expressed by formula 20 or 21 for the filter bank. A similar manner applies to the second normalization unit 830. From the viewpoint of performance, normalization in which such a function F of the average mel spectrum $\bar{S}$ and the mel spectrum S is used is preferable to normalization in which division is performed, using the average mel spectrum $\bar{S}$.

FIG. 9(a) is a flowchart showing an example of the flow of the process of extracting delta features of speech in the delta feature calculation unit in the speech feature extraction apparatus according to the third embodiment of the present invention. The process starts from step 900. The spectrum of a speech signal segmented into frames for each frequency bin is input to the first difference calculation unit 800. Then, for each frame, the first difference calculation unit 800 calculates a difference of the spectrum between continuous frames for each frequency bin as the delta spectrum $\Delta s_t$ to store the delta spectrum $\Delta s_t$ in a storage area such as the RAM 330 shown in FIG. 3.

The first mel filter bank processing unit 805 reads the delta spectrum $\Delta s_t$ from the storage area and multiplies, for each frame, the delta spectrum $\Delta s_t$ for each frequency bin by the weight of a mel filter bank to add up the products and store the total as the mel delta spectrum $\Delta S_t$ for each filter bank in the storage area (step 905). The first normalization unit 810 reads the mel delta spectrum $\Delta S_t$ from the storage area and normalizes, for each frame, the mel delta spectrum $\Delta S_t$ for each filter bank by dividing the mel delta spectrum $\Delta S_t$ by the function F of the average mel spectrum $\overline{S}$ for the filter bank to store the result in the storage area (step 910).

The order of an operation by the first mel filter bank processing unit 805 and an operation by the first normalization unit 810 surrounded by a dotted line 920 may be reversed. When an operation by the first mel filter bank processing unit 805 follows an operation by the first normalization unit 810, the function F used by the first normalization unit 810 for normalization is the function F of the average spectrum $\overline{s}$ for each frequency bin. Moreover, the function F may be the average spectrum $\overline{s}$, the average mel spectrum $\overline{S}$, or that shown in formula 20 or 21, as described above. Moreover, normalization may be performed by performing logarithmic compression in addition to division in which the average spectrum $\overline{s}$ and the average mel spectrum $\overline{S}$ are used.

Then, the first discrete cosine transform unit 815 reads the normalized mel delta spectrum for each filter bank from the storage area and performs discrete cosine transform of the normalized mel delta spectrum to output the result as a delta feature (step 915). Then, the process is completed. In this case, the process of extracting delta features in the delta feature calculation unit in the speech feature extraction apparatus according to the first (or second) embodiment corresponds to a case where operations in steps 905 and 915 (or an operation in step 915) are omitted in FIG. 9(a).

FIG. 9(b) is a flowchart showing an example of the flow of the process of extracting delta-delta features in the delta-delta feature calculation unit in the speech feature extraction apparatus according to the third embodiment of the present invention. The process starts from step 920. The delta spectrum $\Delta s_t$ is input to the second difference calculation unit 820 from the first difference calculation unit 800. Then, for each frame, the second difference calculation unit 820 calculates a difference of the delta spectrum $\Delta s_t$ between continuous frames for each frequency bin as the delta-delta spectrum $\Delta\Delta s_t$ to store the delta-delta spectrum $\Delta\Delta s_t$ in a storage area such as the RAM 330 shown in FIG. 3.

The second mel filter bank processing unit 825 reads the delta-delta spectrum $\Delta\Delta s_t$ from the storage area and multiplies, for each frame, the delta-delta spectrum $\Delta\Delta s_t$ for each frequency bin by the weight of a mel filter bank to add up the products and store the total as the mel delta-delta spectrum $\Delta\Delta S_t$ for each filter bank in the storage area (step 925). The second normalization unit 830 reads the mel delta-delta spectrum $\Delta\Delta S_t$ from the storage area and normalizes, for each frame, the mel delta-delta spectrum $\Delta\Delta S_t$ for each filter bank by dividing the mel delta-delta spectrum $\Delta\Delta S_t$ by the function F of the average mel spectrum $\overline{S}$ for the filter bank to store the result in the storage area (step 930).

The order of an operation by the second mel filter bank processing unit 825 and an operation by the second normalization unit 830 surrounded by a dotted line 940 may be reversed. When an operation by the second mel filter bank processing unit 825 follows an operation by the second normalization unit 830, the function F used by the second normalization unit 830 for normalization is the function F of the average spectrum $\overline{s}$ for each frequency bin. Moreover, the function F may be the average spectrum $\overline{s}$, the average mel spectrum $\overline{S}$, or that shown in formula 20 or 21, as described above. Moreover, normalization may be performed by performing logarithmic compression in addition to division in which the average spectrum $\overline{s}$ and the average mel spectrum $\overline{S}$ are used.

Then, the second discrete cosine transform unit 835 reads the normalized mel delta-delta spectrum for each filter bank from the storage area and performs discrete cosine transform of the normalized mel delta-delta spectrum to output the result as a delta-delta feature (step 935). Then, the process is completed. In this case, the process of extracting delta-delta features in the delta-delta feature calculation unit in the speech feature extraction apparatus according to the first (or second) embodiment corresponds to a case where operations in steps 925 and 935 (or an operation in step 935) are omitted in FIG. 9(b).

Figure 10:
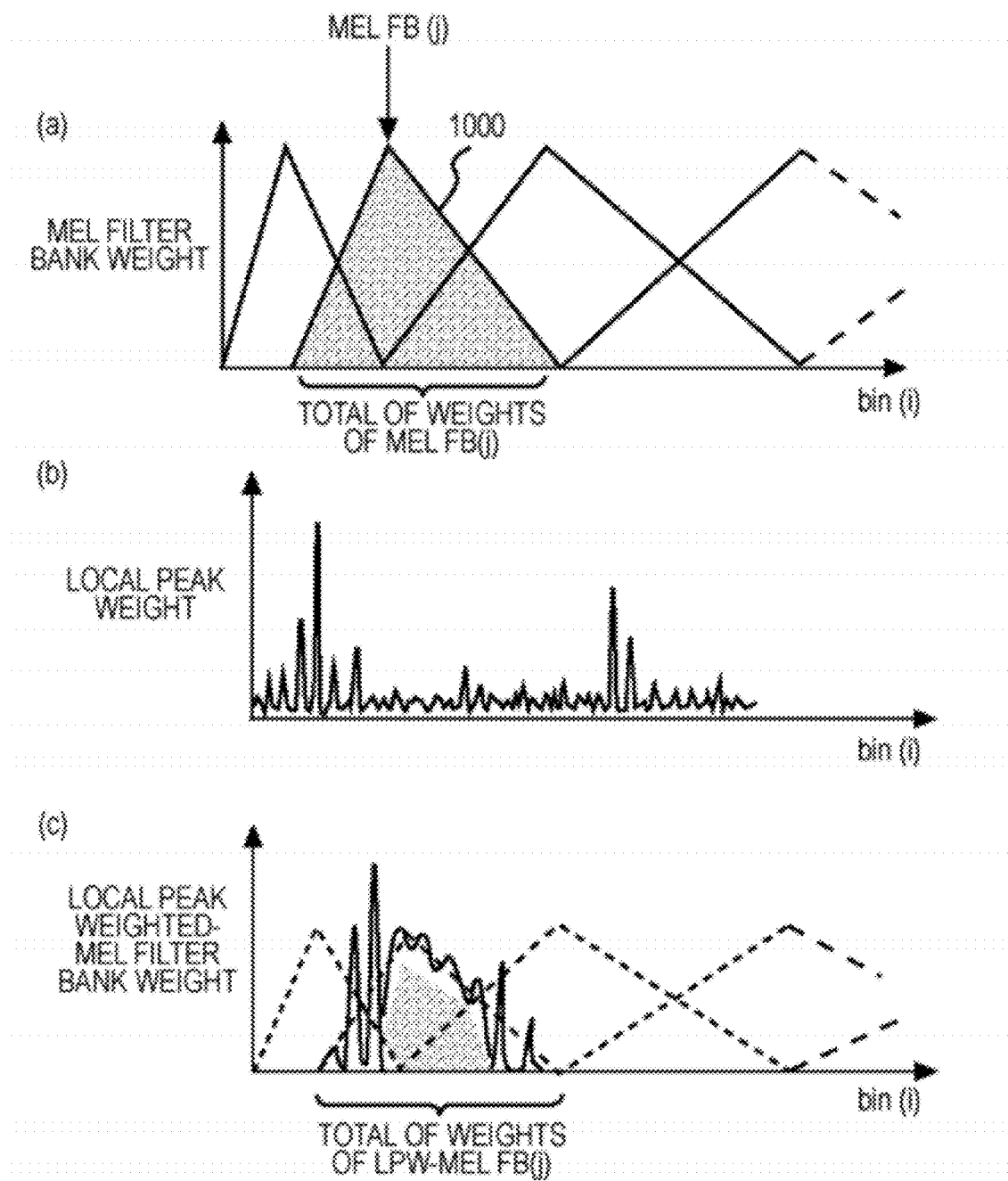
FIG. 10(a) is a graph showing an exemplary Mel-FB Weight.
FIG. 10(b) is a graph showing an exemplary Local Peak Weight.
FIG. 10(c) is a graph showing an exemplary LPW-Mel-FB Weight.

In the second and third embodiments, instead of the weight of a mel filter bank used by the first mel filter bank processing units 705 and 805 and the second mel filter bank processing units 720 and 825, the product of a filter (hereinafter called a Local Peak Weight) and the weight of a mel filter bank may be used. The filter has a weight in a harmonic structure portion in a voice interval and is substantially flat in a voiceless interval with no harmonic structure. A new weight created in this manner will next be described with reference to FIGS. 10 and 11.

FIG. 10(a) is a graph showing an example of the weight of a mel filter bank. Each of the first mel filter bank processing units 705 and 805 and the second mel filter bank processing units 720 and 825 transforms respective spectra for frequency bins set at even intervals in the frequency direction into a spectrum for each filter bank that is a larger unit by multiplying the spectra for the frequency bins by the weight of a mel filter bank and adding up the products, as described above.

Filter banks are disposed at even intervals on the mel frequency scale matching human hearing properties and are each constructed as a triangle weight 1000, as shown in FIG. 10(a). The weight Mel_FB_Weight(j,i) of a mel filter bank is defined, a contribution to the filter bank for each frequency bin being the weight, as shown in the right side of formula 7.

Human pronunciation has a harmonic structure in vowels. That is, energy is not distributed evenly through all frequency bins, but the energy of voice is distributed in non-contiguous frequency bins in the case of an utterance with a high fundamental frequency, for example, an utterance by a woman or a child. Thus, when a weight is assigned evenly to even a frequency bin without voice energy, as is the case with the aforementioned mel filter bank, noise is prone to be picked up accordingly. Thus, a new weight is preferably used. In the new weight, a higher weight is assigned to a peak portion corresponding to a harmonic structure, a low weight is assigned to a valley portion, and a normal Mel-FB Weight is gradually approached when no peak is observed.

To that end, for each frame, information on peaks and valleys corresponding to the harmonic structure of spectra is first obtained as Local Peak Weights (LPWs) as shown in FIG. 10(b) on the basis of input spectra. A method for calculating an LPW is described below. Then, a new weight is obtained by calculating the product of a Mel-FB Weight and an LPW, and the result of normalizing the new weight by dividing the new weight by the total for each filter bank is defined an LPW-Mel-FB Weight as shown in the following formula.

$$\text{LPW\_Mel\_FB\_Weight}(j, i) = \frac{LPW(i) \cdot \text{Mel\_FB\_Weight}(j, i)}{\sum_k LPW(k) \cdot \text{Mel\_FB\_Weight}(j, k)} \quad \text{[Formula 22]}$$

FIG. 10(c) is a graph showing an LPW-Mel-FB Weight obtained in this manner. In the second and third embodiments, the first mel filter bank processing units 705 and 805 and the second mel filter bank processing units 720 and 825 may perform transform, using an LPW-Mel-FB Weight instead of a Mel-FB Weight, as shown in the following formulae.

$$\Delta S_t(j) = \sum_i \Delta s_t(i) \cdot \text{LPW\_Mel\_FB\_Weight}(j, i) \quad \text{[Formula 23]}$$

$$\Delta\Delta S_t(j) = \sum_i \Delta\Delta s_t(i) \cdot \text{LPW\_Mel\_FB\_Weight}(j, i) \quad \text{[Formula 24]}$$

An LPW-Mel-FB Weight is used to improve the robustness against wide-band noise. For example, when noise is music or an another person's utterance or when there is no noise and there is only reverberation, an LPW-Mel-FB Weight need not be used.

Figure 11:
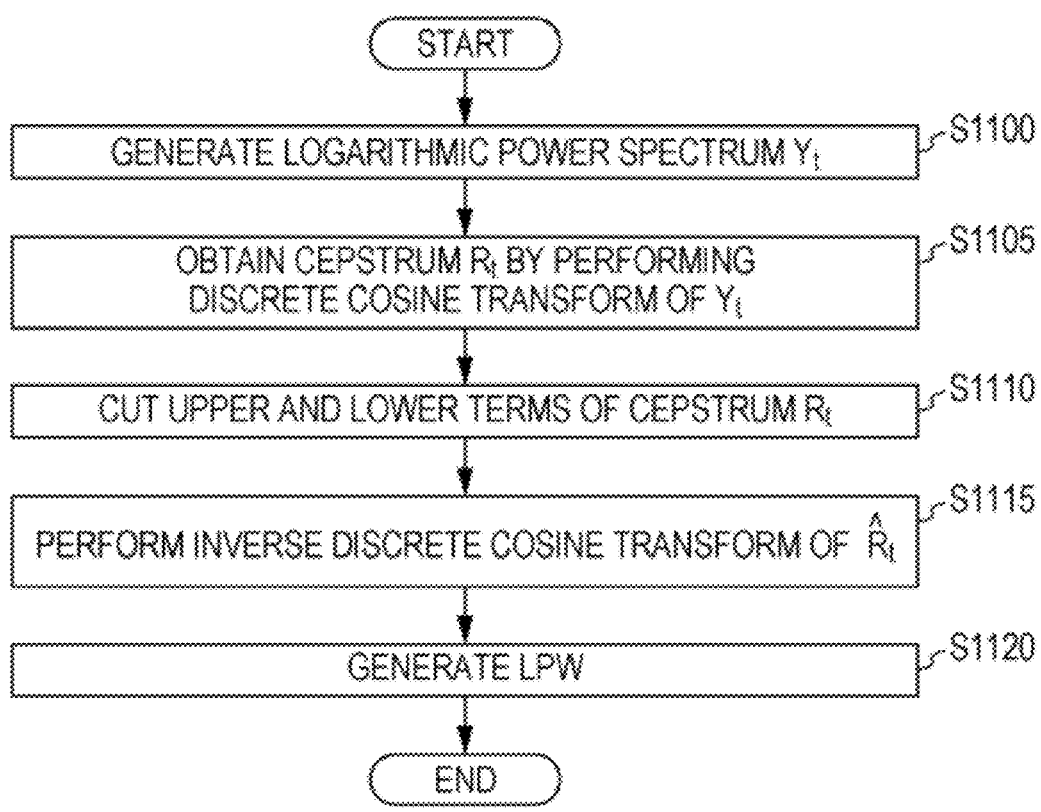
FIG. 11 is a flowchart showing an example of the flow of the process of generating a Local Peak Weight.

Referring to FIG. 11, a method for creating an LPW will next be described. Basically, the method for creating an LPW is the same as a method for creating an enhancement filter for enhancing observed speech described in Japanese Unexamined Patent Application Publication No. 2009-58708 disclosing an invention by the inventors. The process starts from step 1100. A logarithmic power spectrum $Y_t$ of the spectrum $s_t$ at the tth frame of observed speech is first obtained according to the following formula.

$$Y_t(i) = \log(|s_t(i)|^2) \quad \text{[Formula 25]}$$

Then, discrete cosine transform of the logarithmic power spectrum $Y_t$ is performed according to the following formula to obtain a cepstrum $R_t$ (step 1105).

$$R_t(h) = \text{DCT}(Y_t(i)) \quad \text{[Formula 26]}$$

In formula 26, symbol DCT represents transformation by the discrete cosine transform matrix D(h,j) in formula 9. Then, since the cepstrum $R_t$ is a coefficient in which the outline feature of a logarithmic spectrum is extracted, according to the following formula, only terms in an area corresponding to the harmonic structure of a human utterance are left, and the other terms are cut (step 1110).

$$\begin{cases} \hat{R}_t(h) = \varepsilon \cdot R_t(h), & h < \text{lower\_cep\_num or } h > \text{upper\_cep\_num} \\ \hat{R}_t(h) = R_t(h), & \text{other } h \end{cases} \quad \text{[Formula 27]}$$

In formula 27, $\varepsilon$ is zero or a very small constant. Moreover, lower_cep_num and upper_cep_num correspond to a possible range as a harmonic structure. In evaluation experiments described below, assuming that the fundamental frequency of a human utterance falls within 100 Hz to 400 Hz, lower_cep_num is set to 40, and upper_cep_num is set to 160. These values are exemplary settings in a case where the sampling frequency is 16 kHz, and the FFT width is 512 points.

Then, the cepstrum $R_t$ having been processed is transformed back to the logarithmic spectrum domain by performing inverse discrete cosine transform, as shown in the following formula (step 1115).

$$W_t(i) = \text{DCT}^{-1}(\hat{R}_t(h)) \quad \text{[Formula 28]}$$

In formula 28, symbol DCT$^{-1}$ represents transformation by the inverse matrix of the discrete cosine transform matrix D(h,j) in formula 9.

In the last step 1120, the result of performing inverse discrete cosine transform is first transformed back from the logarithmic spectrum domain to the power spectrum domain according to formula 29. Then, normalization is performed according to formula 30 so that the average becomes one to finally create an LPW. Then, the process is completed.

$$w_t(i) = \exp(W_t(i)) \quad \text{[Formula 29]}$$

$$LPW_t(i) = w_t(i) \cdot \frac{\text{Num\_bin}}{\sum_k w_t(k)} \quad \text{[Formula 30]}$$

In formula 30, Num_bin is the total number of frequency bins.

(Fourth Embodiment) FIG. 12(a) shows the functional components of a delta feature calculation unit in a speech feature extraction apparatus according to a fourth embodiment of the present invention. The delta feature calculation unit in the speech feature extraction apparatus according to the fourth embodiment is that in which a first difference calculation unit 1215 is added to the components of the static feature calculation unit described in relation to FIG. 5. The first difference calculation unit 1215 is disposed in a position such that an operation by the first difference calculation unit 1215 is performed after operations in the other components, as shown in FIG. 12(a).

A mel filter bank processing unit 1200, a logarithm calculation unit 1205, and a discrete cosine transform unit 1210 shown in FIG. 12(a) each have the same function as a corresponding component in the static feature calculation unit described in relation to FIG. 5 except that the input and output differ. Moreover, the first difference calculation unit 1215 shown in FIG. 12(a) has the same function as the first difference calculation unit 600 in the speech feature extraction apparatus according to the first embodiment except that the input and output differ. Thus, the description of the respective functions of the components is omitted to avoid the repetition.

However, a value to be input to the mel filter bank processing unit 1200 shown in FIG. 12(a) is different from that to be input to the mel filter bank processing unit 500 shown in FIG. 5 and is the sum of the spectrum $s_t$ of a speech signal segmented into frames for each frequency bin and the average spectrum $\bar{s}$ for the frequency bin. Since such a value is input to the delta feature calculation unit, a value finally obtained as a delta feature, i.e., the output of the first difference calculation unit 1215, is substantially equivalent to a delta feature output by the delta feature calculation unit in the speech feature extraction apparatus according to the third embodiment performing normalization by the use of the function F expressed by formula 21. On the other hand, the delta feature calculation unit in the speech feature extraction apparatus according to the fourth embodiment can be configured by slightly changing an existing static feature extraction unit and thus is preferable to the delta feature calculation unit in the speech feature extraction apparatus according to the third embodiment.

The output of the first difference calculation unit 1215 finally obtained as a delta feature is expressed by the following formula.

$$\Delta C1_t = \frac{\sum_{\theta=1}^{\Theta} \theta(C1_{t+\theta} - C1_{t-\theta})}{2\sum_{\theta=1}^{\Theta} \theta^2}$$ [Formula 31]

where $C1_t = DCT(S1'_t)$, $S1'_t = \log S1_t$, $S1_t = \sum_i (s(i)_t + \overline{s(i)}) \cdot \text{Mel\_FB\_Weight}(j, i)$ In formula 31, the filter bank number j is omitted.

Figure 12:
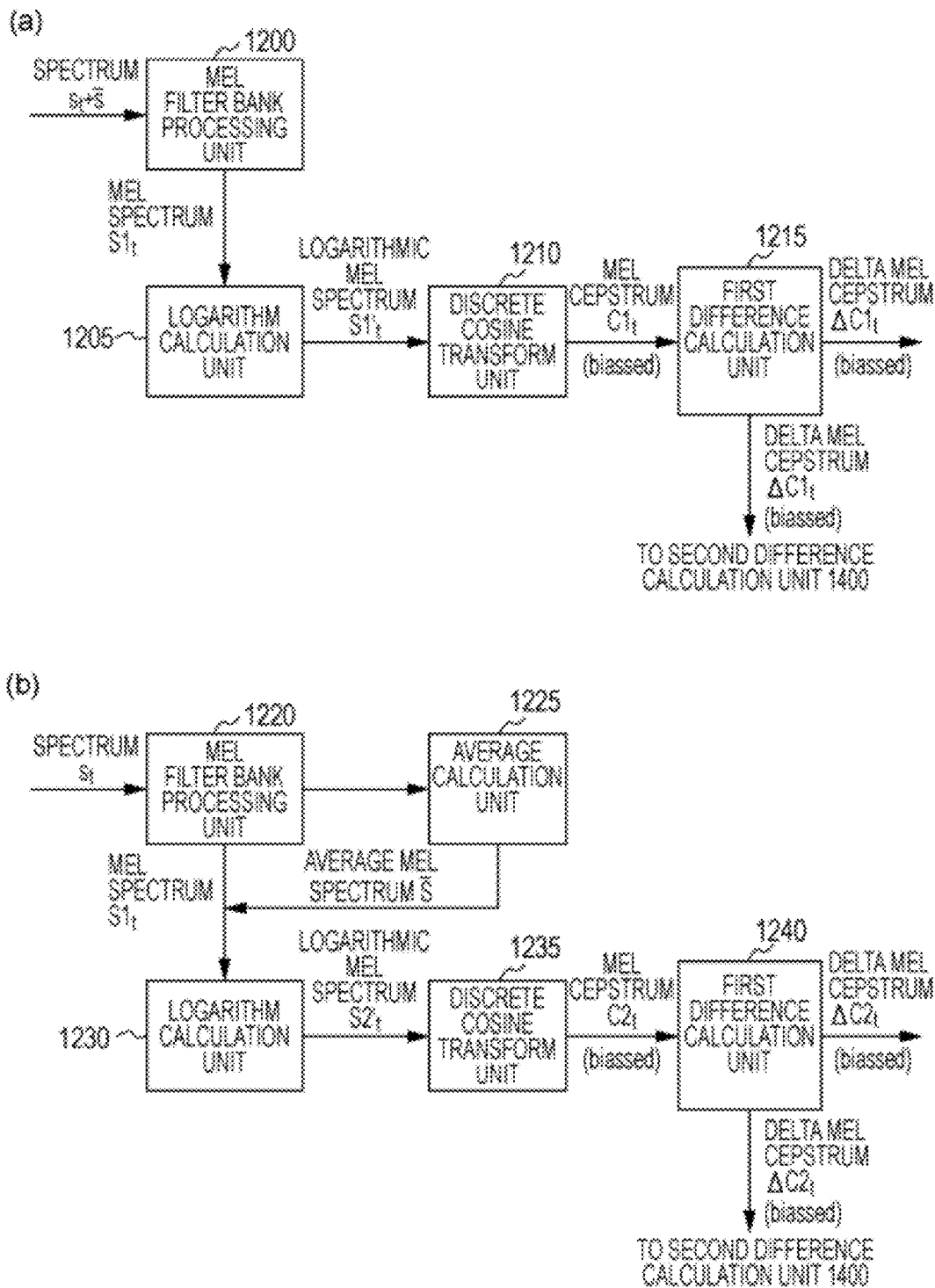
FIG. 12(a) shows the functional components of a delta feature calculation unit in a speech feature extraction apparatus according to a fourth embodiment of the present invention.
FIG. 12(b) shows the functional components of a delta feature calculation unit in a speech feature extraction apparatus according to a fifth embodiment of the present invention.

(Fifth Embodiment) FIG. 12(*b*) shows the functional components of a delta feature calculation unit in a speech feature extraction apparatus according to a fifth embodiment of the present invention. Basically, the delta feature calculation unit in the speech feature extraction apparatus according to the fifth embodiment includes the same components as the delta feature calculation unit in the speech feature extraction apparatus according to the fourth embodiment except that the timing of adding the average spectrum $\bar{s}$ comes after (not before) an operation by a mel filter bank processing unit 1220. However, since the average spectrum $\bar{s}$ needs to be added at the aforementioned timing, in the delta feature calculation unit in the speech feature extraction apparatus according to the fifth embodiment, an average calculation unit 1225 is newly added to the components of the delta feature calculation unit in the speech feature extraction apparatus according to the fourth embodiment.

In FIG. 12(*b*), the mel spectrum $S_t$ is input to the average calculation unit 1225 from the mel filter bank processing unit 1220. Then, for each filter bank, the average calculation unit 1225 calculates the average mel spectrum $\overline{S}$, which is the average of the mel spectra $S_t$ through all frames, to output the average mel spectrum $\overline{S}$ to a logarithm calculation unit 1230. The mel spectrum $S_t$ from the mel filter bank processing unit 1220 and the average mel spectrum $\overline{S}$ from the average calculation unit 1225 are input to the logarithm calculation unit 1230. Then, the logarithm calculation unit 1230 calculates the logarithm of the sum of the mel spectrum $S_t$ and the average mel spectrum $\overline{S}$ to output the sum to a discrete cosine transform unit 1235.

The other components shown in FIG. 12(*b*), i.e., the mel filter bank processing unit 1220, the discrete cosine transform unit 1235, and a first difference calculation unit 1240, each have the same function as a corresponding component in the delta feature calculation unit in the speech feature extraction apparatus according to the fourth embodiment except that the input and output differ. Thus, the description of the other components is omitted.

In the delta feature calculation unit according to the fifth embodiment, a value finally obtained as a delta feature, i.e., the output of the first difference calculation unit 1240, is substantially equivalent to a delta feature output by the delta feature calculation unit in the speech feature extraction apparatus according to the third embodiment performing normalization by the use of the function F expressed by formula 21. On the other hand, the delta feature calculation unit in the speech feature extraction apparatus according to the fifth embodiment can be configured by slightly changing an existing static feature extraction unit and thus is preferable to the delta feature calculation unit in the speech feature extraction apparatus according to the third embodiment.

The output of the first difference calculation unit 1240 finally obtained as a delta feature is expressed by the following formula.

$$\Delta C2_t = \frac{\sum_{\theta=1}^{\Theta} \theta(C2_{t+\theta} - C2_{t-\theta})}{2\sum_{\theta=1}^{\Theta} \theta^2}$$ [Formula 32]

where $C2_t = DCT(S2'_t)$, $S2'_t = \log(S_t + \overline{S})$, $S_t = \sum_i s(i)_t \cdot \text{Mel\_FB\_Weight}(j, i)$ In formula 32, the filter bank number j is omitted.

FIG. 13(*a*) is a flowchart showing an example of the flow of the process of extracting delta features of speech in the delta feature calculation unit in the speech feature extraction apparatus according to the fourth embodiment of the present invention. The process starts from step 1300. The sum of the spectrum $s_t$ of a speech signal segmented into frames for each frequency bin in each frame and the average spectrum $\bar{s}$ through all frames that are overall speech is input to the mel filter bank processing unit 1200. Then, for each frame, the mel filter bank processing unit 1200 multiplies the aforementioned sum for each frequency bin by the weight of a mel filter bank to add up the products and store an output $S1_t$ thereof in a storage area such as the RAM 330 shown in FIG. 3.

Then, the logarithm calculation unit 1205 reads $S1_t$ from the storage area and calculates, for each frame, the logarithm of $S1_t$ for each filter bank to store an output $Sit$ thereof in the storage area (step 1305). The discrete cosine transform unit 1210 reads $S1_t'$ from the storage area and performs, for each frame, discrete cosine transform of $S1_t'$ for each filter bank to store an output $C1_t$ thereof in the storage area (step 1310).

Finally, the first difference calculation unit 1215 reads $C1_t$ from the storage area and calculates, for each frame, a difference $\Delta C1_t$ of $C1_t$ for each filter bank between continuous frames as a delta feature (step 1315). Then, the process is completed.

FIG. 13(*b*) is a flowchart showing an example of the flow of the process of extracting delta features of speech in the delta feature calculation unit in the speech feature extraction apparatus according to the fifth embodiment of the present invention. The process starts from step 1320. The spectrum of a speech signal segmented into frames for each frequency bin in each frame is input to the mel filter bank processing unit 1220. Then, for each frame, the mel filter bank processing unit 1220 multiplies the spectrum for each frequency bin by the weight of a mel filter bank to add up the products to calculate the mel spectrum S for each filter bank and store the mel spectrum S in a storage area such as the RAM 330 shown in FIG. 3.

Then, the average calculation unit 1225 reads the mel spectrum S for each filter bank in each frame from the storage area and calculates, for each filter bank, the average mel spectrum $\overline{S}$ through all frames that are overall speech to store the average mel spectrum $\overline{S}$ in the storage area (step 1325). Then, the logarithm calculation unit 1230 reads the mel spectrum S for each filter bank and the average mel spectrum $\overline{S}$ for each filter bank in each frame from the storage area and calculates the logarithm of a sum $S2_t$ of the mel spectrum S for each filter bank and the average mel spectrum $\overline{S}$ for the filter bank to store an output $S2_t'$ thereof in the storage area (step 1330).

Then, the discrete cosine transform unit 1235 reads $S2_t'$ from the storage area and performs, for each frame, discrete cosine transform of $S2_t'$ for each filter bank to store an output $C2_t$ thereof in the storage area (step 1335). Finally, the first difference calculation unit 1240 reads $C2_t$ from the storage area and calculates, for each frame, a difference $\Delta C2_t$ of $C2_t$ for each filter bank between continuous frames as a delta feature (step 1340). Then, the process is completed.

Figure 14:
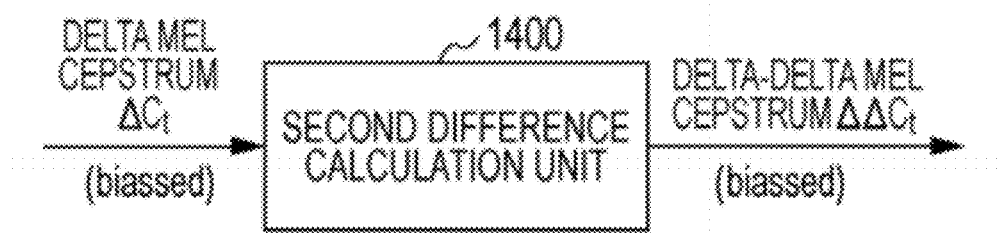
FIG. 14 shows the functional components of a delta-delta feature calculation unit in the speech feature extraction apparatus according to the fourth or fifth embodiment of the present invention.

FIG. 14 shows the functional components of a delta-delta feature calculation unit in the speech feature extraction apparatus according to the fourth (or fifth) embodiment of the present invention. The delta-delta feature calculation unit in the speech feature extraction apparatus according to the fourth (or fifth) embodiment includes a second difference calculation unit 1400. The second difference calculation unit 1400 has the same function as the first difference calculation unit 1215 (or the first difference calculation unit 1240) in the speech feature extraction apparatus according to the fourth (or fifth) embodiment except that the input and output differ.

That is, the output from the first difference calculation unit 1215 (or the first difference calculation unit 1240), i.e., the delta mel cepstrum $\Delta C1_t$ (or $\Delta C2_t$) expressed by formula 31 (or formula 32), is input to the second difference calculation unit 1400. Then, for each frame, the second difference calculation unit 1400 calculates a delta-delta mel cepstrum $\Delta\Delta C1_t$ (or $\Delta\Delta C2_t$) that is a difference of the delta mel cepstrum $\Delta C1_t$ (or $\Delta C2_t$) for each filter bank between continuous frames as a delta-delta feature. The output of the second difference calculation unit 1400 is expressed by the following formula.

$$\Delta\Delta C_t = \frac{\sum_{\theta=1}^{\Theta} \theta(\Delta C_{t+\theta} - \Delta C_{t-\theta})}{2\sum_{\theta=1}^{\Theta} \theta^2} \quad \text{[Formula 33]}$$

where $\Delta C_t = \Delta C1_t$ or $\Delta C_t = \Delta C2_t$

In formula 33, the filter bank number j is omitted.

Figure 15:
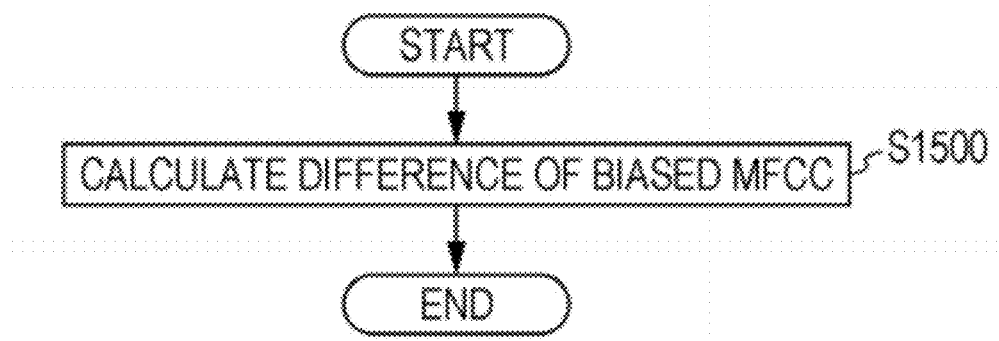
FIG. 15 is a flowchart showing an example of the flow of the process of extracting delta-delta features in the delta-delta feature calculation unit in the speech feature extraction apparatus according to the fourth or fifth embodiment of the present invention.

FIG. 15 is a flowchart showing an example of the flow of the process of extracting delta-delta features in the delta-delta feature calculation unit in the speech feature extraction apparatus according to the fourth (or fifth) embodiment of the present invention. The process starts from step 1500. The output from the first difference calculation unit 1215 (or the first difference calculation unit 1240), i.e., the delta mel cepstrum $\Delta C1_t$ (or $\Delta C2_t$) expressed by formula 31 (or formula 32), is input to the second difference calculation unit 1400. Then, for each frame, the second difference calculation unit 1400 calculates the delta-delta mel cepstrum $\Delta\Delta C1_t$ (or $\Delta\Delta C2_t$) that is a difference of the delta mel cepstrum $\Delta C1_t$ (or $\Delta C2_t$) for each filter bank between continuous frames as a delta-delta feature. Then, the process is completed.

Evaluation experiments of speech recognition in which features proposed by the present invention are used will next be described with reference to FIGS. 16 to 18. In the evaluation experiments described with reference to FIGS. 16 and 17, the database Corpus and Environments for Noisy Speech RECognition (CENSREC)-4 for evaluating a reverberation environment, which is created by Information Processing Society of Japan (IPSJ) SIG-SLP Noisy Speech Recognition Evaluation Working Group, is used.

In CENSREC-4, a reverberation environment is simulated by superposing impulse responses in various reverberation environments on dry sources that are recorded speech without reverberation and noise. In CENSREC-4, respective evaluations under two conditions Clean Condition and Multi-Condition are provided. Under Clean Condition, speech recognition is performed, using an acoustic model in which learning has been performed with non-reverberant speech. On the other hand, under Multi-Condition, speech recognition is performed, using an acoustic model in which learning has been performed with reverberant speech. In either of the evaluations under the conditions, when speech recognition is performed, i.e., when a test is performed, reverberant speech data is used.

Test sets in CENSREC-4 are classified into two types A and B. A test set in a reverberation environment that is the same as an environment when learning an acoustic model under Multi-Condition is defined as a test set A, and a test set in a reverberation environment that is different from an environment when learning an acoustic model under Multi-Condition is defined as a test set B. Moreover, the test sets A and B each include respective tests in four different environments, as shown in FIGS. 16 and 17, respectively.

Features defined as baselines in CENSREC-4 are a 39-dimensional vector including MFCC 12 dimensions as static features, delta MFCC 12 dimensions as delta features, delta-delta MFCC 12 dimensions as delta-delta features, and three dimensions: the logarithm of speech power and the delta and delta-delta. That is, in CENSREC-4, an acoustic model is constructed, using the features of the aforementioned 39-dimensional vector, under each of Clean Condition and Multi-Condition.

The inventors performed the following two evaluation experiments.

Evaluation Experiment 1: The respective character string recognition rates of the following two cases are compared: a case where only the static feature MFCC 12 dimensions are used and a case where 24 dimensions including the static feature MFCC 12 dimensions and the delta feature 12 dimensions are used. In this case, two types of delta features are evaluated: the delta MFCC 12 dimensions and linear delta feature 12 dimensions calculated by the delta feature calculation unit in the speech feature extraction apparatus according to the third embodiment.

Evaluation Experiment 2: The respective character string recognition rates of the following two cases are compared: a case where the delta features and delta-delta features in the baseline 39 dimensions are respectively replaced with the linear delta features and linear delta-delta features of the present invention (refer to a "linear Δ" field in a table in FIG. 17) and a case where the baseline 39 dimensions are left intact (refer to a "baseline" field in the table in FIG. 17). Linear delta features and linear delta-delta features that are respectively calculated by the delta feature calculation unit and delta-delta feature calculation unit in the speech feature extraction apparatus according to the third embodiment are used as the linear delta features and linear delta-delta features of the present invention.

FIG. 16 shows the results of evaluation experiment 1. The results of evaluation experiment 1 give the following findings. The use of the delta feature 12 dimensions in combination improves the speech recognition rate from that in a case where only the static feature MFCC 12 dimensions are used. Moreover, the speech recognition rate is further improved by using the linear delta features of the present invention instead of delta MFCCs having been hitherto frequently used as delta features. For example, under Clean Condition, the average speech recognition rate of the test sets A and B is significantly improved from 35.3% in a case where delta MFCCs are used to 59.2%. Even under Multi-Condition, the average speech recognition rate of the test sets A and B is improved from 71.9% in a case where delta MFCC are used to 81.5%.

FIG. 17 shows the results of evaluation experiment 2. Even in evaluation experiment 2, the speech recognition rate is further improved by using the linear delta features and linear delta-delta features of the present invention. For example, under Clean Condition, the average speech recognition rate of the test sets A and B is improved from 65.2% of the known baseline to 73.1%. Even under Multi-Condition, the average speech recognition rate of the test sets A and B is improved from 75.2% of the known baseline to 82.7%.

The linear delta features and linear delta-delta features of the present invention significantly improve the speech recognition rate in a reverberation environment, as described above, and evaluation experiments 1 and 2 show the effectiveness of the linear delta features and linear delta-delta features of the present invention as features in a reverberation environment.

In the evaluation experiment described with reference to FIG. 18, the database Corpus and Environments for Noisy Speech REcognition (CENSREC)-3 for evaluating a noise environment, which is created by Information Processing Society of Japan (IPSJ) SIG-SLP Noisy Speech Recognition Evaluation Working Group, is used.

In CENSREC-3, speech uttered in various noise environments in a vehicle is recorded, and the speech recognition rate can be calculated under each driving condition, such as stop, city drive, or high speed drive, and each condition of, for example, an air conditioner's fan, the openness of windows, or playback of music. Features defined as baselines in CENSREC-3 are the same 39 dimensions as the aforementioned CENSREC-4. The inventors performed the following evaluation experiment using CENSREC-3.

The respective word recognition rates (accuracies %) of the following two cases are compared: a case where the baseline 39 dimensions are left intact (refer to a "baseline" field in a table in FIG. 18) and a case where the MFCCs, delta MFCCs, and delta-delta MFCCs in the baseline 39 dimensions are replaced with those obtained by the use of LPW-Mel-FB Weights instead of Mel-FB Weights (refer to a "LPW-Mel" field in the table in FIG. 18).

Moreover, the respective word recognition rates (accuracies %) of the following two cases are compared: the case where the baseline 39 dimensions are left intact and a case where the delta features and delta-delta features in the baseline 39 dimensions are respectively replaced with the linear delta features and linear delta-delta features of the present invention (refer to a "linear Δ" field in the table in FIG. 18). In this case, linear delta features and linear delta-delta features that are respectively calculated by the delta feature calculation unit and delta-delta feature calculation unit in the speech feature extraction apparatus according to the third embodiment are used as the linear delta features and linear delta-delta features of the present invention.

Moreover, the respective word recognition rates (accuracies %) of the following two cases are compared: the case where the baseline 39 dimensions are left intact and a case where linear delta features and linear delta-delta features that are respectively calculated by the delta feature calculation unit and delta-delta feature calculation unit in the speech feature extraction apparatus according to the third embodiment, the delta feature calculation unit and delta-delta feature calculation unit using LPW-Mel-FB Weights instead of Mel-FB Weights, are used as the linear delta features and linear delta-delta features of the present invention (refer to a "LPW-Mel+linear Δ" field in the table in FIG. 18).

FIG. 18 shows the results of evaluation experiment 2. Comparison of "baseline" with "linear Δ" shows that the word recognition rate (accuracy %) as total is 78.9% for "baseline" and 83.3% for "linear Δ", and thus the word recognition rate is improved by using the linear delta features and linear delta-delta features of the present invention. Especially, improvements at the time of window open and fan maximum in high speed drive are significant. Even for music noise, an improvement is achieved. Thus, it can be found that the linear delta features and linear delta-delta features of the present invention are effective in a wide range.

Moreover, comparison of "baseline" with "LPW-Mel" shows that the word recognition rates (accuracies %) of "LPW-Mel" are higher than those of "baseline" except in music noise, and thus improvements are achieved. Especially, improvements at the time of window open and fan maximum in high speed drive are significant. Furthermore, comparison of "baseline" with "LPW-Mel+linear Δ" shows that the word recognition rate (accuracy %) at the time of window open in high speed drive is 22.2% for "baseline" and 46.6% for "LPW-Mel+linear Δ", and the word recognition rate (accuracy %) at the time of fan maximum in high speed drive is 58.2% for "baseline" and 74.9% for "LPW-Mel+linear Δ". Thus, it can be found that significant improvements can be achieved by combining the linear delta features and linear delta-delta features of the present invention with LPW-Mel-FB.

While the present invention has been described, using the embodiments, the technical scope of the present invention is not limited to that described in the embodiments. It is apparent to those skilled in the art that various modifications or improvements can be made in the embodiments. Thus, naturally, the embodiments, in which such modifications or improvements are made, is covered by the technical scope of the present invention.

We claim:

1. A method of extracting a speech feature, the method comprising the steps of:

receiving, as an input, a spectrum of a speech signal segmented into frames for each frequency bin;

calculating a delta spectrum for each frame, wherein said delta spectrum is a difference of said spectrum within continuous frames for said frequency bin;

storing said delta spectrum in said storage area;

calculating a mel delta spectrum of said frame for each filter bank, wherein said mel delta spectrum is a total of respective products of said delta spectra for said individual frequency bins and corresponding weights of a mel filter bank;

storing said mel delta spectrum in said storage area;

normalizing said mel delta spectrum of said frame for said filter bank by dividing said mel delta spectrum by a function of an average mel spectrum, wherein said average mel spectrum is an average of mel spectra through all frames that comprise overall speech for said filter bank;

storing said normalized mel delta spectrum in said storage area;

reading said normalized mel delta spectrum for said filter bank from said storage area; and performing discrete cosine transform of said normalized mel delta spectrum, wherein a result of performing said discrete cosine transform is defined as a delta feature; and wherein at least one of the steps is carried out by a computer device.

2. The method according to claim 1, wherein, for a given frame and a given filter bank, said function of said average mel spectrum outputs a larger value of a mel spectrum for said given filter bank for said given frame and said average mel spectrum for said given filter bank.

3. The method according to claim 1, wherein said function of said average mel spectrum is said average mel spectrum.

4. The method according to claim 1, wherein said step of calculating a mel delta spectrum further comprises the steps of:

using a product of a filter and each of said weights of said mel filter bank instead of said weights of said mel filter bank, wherein said filter has a weight in a harmonic structure portion in a voice interval and is substantially flat in a voiceless interval with no harmonic structure.

5. A non-transitory computer readable storage medium tangibly embodying a computer readable program code having computer readable instructions which, when implemented, cause a computer to carry out a method comprising the steps of:

receiving, as an input, a spectrum of a speech signal segmented into frames for each frequency bin;

calculating a delta spectrum for each frame, wherein said delta spectrum is a difference of said spectrum within continuous frames for said frequency;

storing said delta spectrum in a storage area;

calculating a mel delta spectrum of said frame for each filter bank, wherein said mel delta spectrum is a total of respective products of said delta spectra for said individual frequency bins and corresponding weights of a mel filter bank;

storing said mel delta spectrum in said storage area;

normalizing said mel delta spectrum of said frame for said filter bank by dividing said mel delta spectrum by a function of an average mel spectrum, wherein said average mel spectrum is an average of mel spectra through all frames that comprise overall speech for said filter bank;

storing said normalized mel delta spectrum in said storage area;

reading said normalized mel delta spectrum for said filter bank from said storage area; and performing discrete cosine transform of said normalized mel delta spectrum, wherein a result of performing said discrete cosine transform is defined as a delta feature.

* * * * *